United States Patent
Luo et al.

(10) Patent No.: US 12,483,863 B2
(45) Date of Patent: Nov. 25, 2025

(54) METHOD FOR MULTICAST COMMUNICATION, FIRST NETWORK DEVICE, AND SECOND NETWORK DEVICE

(71) Applicant: HUAWEI TECHNOLOGIES CO., LTD., Shenzhen (CN)

(72) Inventors: Haiyan Luo, Shenzhen (CN); Yuanping Zhu, Shanghai (CN); Qinghai Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 405 days.

(21) Appl. No.: 18/157,275

(22) Filed: Jan. 20, 2023

(65) Prior Publication Data
US 2023/0164524 A1 May 25, 2023

Related U.S. Application Data

(63) Continuation of application No. PCT/CN2020/105918, filed on Jul. 30, 2020.

(51) Int. Cl.
*H04W 4/08* (2009.01)
*H04W 72/20* (2023.01)
*H04W 80/02* (2009.01)

(52) U.S. Cl.
CPC ............ *H04W 4/08* (2013.01); *H04W 72/20* (2023.01); *H04W 80/02* (2013.01)

(58) Field of Classification Search
CPC ....... H04W 4/08; H04W 72/20; H04W 80/02; H04W 48/12; H04W 76/11;
(Continued)

(56) References Cited

U.S. PATENT DOCUMENTS 9,461,848 B2 * 10/2016 Awano ................. H04L 12/1877
10,440,607 B2 * 10/2019 Fujishiro ............... H04W 76/11
(Continued)

FOREIGN PATENT DOCUMENTS

CN 101605041 A 12/2009
CN 111417211 A 7/2020
(Continued)

OTHER PUBLICATIONS

"3rd Generation Partnership Project; Technical Specification Group Radio Access Network; Study on Integrated Access and Backhaul; (Release 15)", 3GPP TR 38.874 V0.4.0 (Aug. 2018), 55 pages.
(Continued)

*Primary Examiner* — Eunsook Choi
(74) *Attorney, Agent, or Firm* — Maier & Maier, PLLC

(57) ABSTRACT

A method for multicast communication, a first network device, and a second network device. The method includes: a first network device sends first information to a second network device, where the first information indicates an association relationship between multicast service information and a first terminal device; the first network device receives second information from the second network device; the first network device generates a configuration message based on the second information, where the configuration message indicates an association relationship between the multicast service information and a first logical channel, and the first logical channel is a logical channel of the first terminal device; and the first network device sends the configuration message to the first terminal device.

16 Claims, 16 Drawing Sheets

(58) Field of Classification Search
CPC ... H04W 88/085; H04W 76/40; H04W 72/30; H04W 92/16; H04W 4/06
See application file for complete search history.

(56) References Cited

U.S. PATENT DOCUMENTS

| | | | |
|---|---|---|---|
| 2018/0103437 A1 | 4/2018 | Kommi et al. | |
| 2018/0145839 A1 | 5/2018 | Lee et al. | |
| 2020/0077287 A1 | 3/2020 | Prasad et al. | |
| 2020/0128363 A1* | 4/2020 | Yavuz | H04W 4/06 |
| 2021/0068004 A1* | 3/2021 | Kadiri | H04L 47/15 |
| 2022/0353642 A1* | 11/2022 | Wang | H04W 76/40 |
| 2023/0156434 A1* | 5/2023 | Mohammed Mikaeil | H04W 72/0446 370/329 |

FOREIGN PATENT DOCUMENTS

| | | |
|---|---|---|
| EP | 3534651 A1 | 9/2019 |
| JP | 2018164271 A | 10/2018 |
| JP | 2023531856 A | 7/2023 |
| WO | 2019129212 A1 | 7/2019 |
| WO | 2020035795 A1 | 2/2020 |
| WO | 2021062778 A1 | 4/2021 |
| WO | 2021087813 A1 | 5/2021 |
| WO | 2021109428 A1 | 6/2021 |

OTHER PUBLICATIONS

Vargas et al., "RAN Logical Architecture and Interfaces for 5G-Xcast", Deliverable D3.3, Feb. 28, 2019, 95 pages.

* cited by examiner

METHOD FOR MULTICAST COMMUNICATION, FIRST NETWORK DEVICE, AND SECOND NETWORK DEVICE

CROSS-REFERENCE TO RELATED APPLICATIONS

This application is a continuation of International Application No. PCT/CN2020/105918, filed on Jul. 30, 2020, the disclosure of which is hereby incorporated by reference in its entirety.

TECHNICAL FIELD

The embodiments relate to the communication field, a method for multicast communication, a first network device, and a second network device.

BACKGROUND

To effectively utilize mobile network resources, a multimedia broadcast multicast service (MBMS) is introduced in the 3rd generation partnership project (3GPP). The service is a technology for transmitting data from one data source to a plurality of targets, to implement network resource sharing and improve utilization of resources, such as air interface resources.

At the current stage, a hybrid multicast-unicast mechanism is discussed. Based on this mechanism, a multicast service may be sent to a terminal device in a unicast manner or may be sent to the terminal device in a multicast manner.

In some communication systems, for example, in a 5G communication system, a network device may be divided into a central unit (CU) and a distributed unit (DU) based on logical functions. Currently, there is no related technology to implement transmitting a multicast service in a unicast manner in a CU-DU architecture.

SUMMARY

The embodiments may provide a method for multicast communication, a first network device, and a second network device, to transmit a multicast service in a unicast manner, and further implement flexible transmission of the multicast service.

According to a first aspect, a method for multicast communication is provided, and includes: A first network device sends first information to a second network device, where the first information indicates an association relationship between multicast service information and a first terminal device; the first network device receives second information from the second network device; the first network device generates a configuration message based on the second information, where the configuration message indicates an association relationship between the multicast service information and a first logical channel, and the first logical channel is a logical channel of the first terminal device; and the first network device sends the configuration message to the first terminal device, where the first network device has a packet data convergence protocol layer function, a service data adaptation protocol layer function, and a radio resource control layer function, and the second network device has a radio link control layer function, a media access control layer function, and a physical layer function.

It should be understood that in the method, the first network device is a CU, and the second network device is a DU. The two network devices may correspond to a same network device (namely, an access network device or a base station).

The multicast service information may indicate a multicast service. The association relationship between the multicast service information and the first terminal device is an association relationship between the multicast service and the first terminal device.

Optionally, the first information may be carried in an interface message, for example, a session start/modification request message, between the first network device and the second network device.

Optionally, the second information may be carried in an interface message, for example, a session start/modification response message, between the first network device and the second network device.

According to the method for multicast communication, through interaction between the first network device and the second network device, the first network device may determine an association relationship between multicast service information and a logical channel of a terminal device, and may send the association relationship to the terminal device, so that a multicast service can be transmitted in a unicast manner based on the association relationship, thereby implementing flexible transmission of the multicast service.

In some implementations of the first aspect, the first information includes the multicast service information and information about the associated first terminal device. The information about the first terminal device indicates the first terminal device.

In some implementations of the first aspect, the second information indicates the association relationship between the multicast service information and the first logical channel. For example, the configuration message may include the second information.

In some implementations of the first aspect, that the first information indicates an association relationship between multicast service information and a first terminal device includes: the first information indicates an association relationship between the multicast service information and a first data radio bearer (DRB) of the first terminal device; and the second information indicates an association relationship between the first DRB and the first logical channel of the first terminal device.

Based on this solution, the first network device may determine that the multicast service information is associated with the first logical channel of the first terminal device.

In some implementations of the first aspect, the multicast service information includes one or more of the following: a multicast area identifier, a temporary mobile group identity (TMGI), a session identifier, and a group radio network temporary identifier (G-RNTI).

For example, in a multimedia broadcast multicast service single frequency network (MBSFN) transmission manner, the multicast service information may include one or more of the following: a multicast area identifier, a TMGI, and a session identifier. In a single-cell point-to-multipoint (SC-PTM) transmission manner, the multicast service information may include one or more of the following: a TMGI, a session identifier, and a G-RNTI.

In some implementations of the first aspect, the configuration message is a radio resource control (RRC) reconfiguration message.

According to a second aspect, a method for multicast communication is provided, and includes: A second network device receives first information from a central unit first network device, where the first information indicates an association relationship between multicast service information and a first terminal device; and the second network device sends second information to the first network device, where the second information is used by the second network device to determine a configuration message, the configuration message indicates an association relationship between the multicast service information and a first logical channel, and the first logical channel is a logical channel of the first terminal device; and the first network device has a packet data convergence protocol layer function, a service data adaptation protocol layer function, and a radio resource control layer function, and the second network device has a radio link control layer function, a media access control layer function, and a physical layer function.

It should be understood that in the method, the first network device is a CU, and the second network device is a DU. The two network devices may correspond to a same network device (namely, an access network device or a base station).

The multicast service information may indicate a multicast service. The association relationship between the multicast service information and the first terminal device is an association relationship between the multicast service and the first terminal device.

According to the method for multicast communication, the first network device may provide the association relationship between the multicast service information and the first terminal device for the second network device, so that the second network device can return the second information to the first network device based on the association relationship between the multicast service information and the first terminal device. The first network device may determine the association relationship between the multicast service information and the first logical channel based on the second information. In this way, multicast service information is associated with a logical channel of a terminal device, so that a multicast service can be transmitted in a unicast manner, thereby implementing flexible transmission of the multicast service.

In some implementations of the second aspect, the first information includes the multicast service information and information about the associated first terminal device. The information about the first terminal device indicates the first terminal device.

In some implementations of the second aspect, the second information indicates the association relationship between the multicast service information and the first logical channel. For example, the configuration message may include the second information.

In some implementations of the second aspect, that the first information indicates an association relationship between multicast service information and a first terminal device includes: the first information indicates an association relationship between the multicast service information and a first DRB of the first terminal device; and the second information indicates an association relationship between the first DRB and the first logical channel of the first terminal device.

Based on this solution, the first network device may determine that the multicast service information is associated with the first logical channel of the first terminal device.

In some implementations of the first aspect, the multicast service information includes one or more of the following: a multicast area identifier, a TMGI, a session identifier, and a G-RNTI.

For example, for an MBSFN transmission manner, the multicast service information may include one or more of the following: a multicast area identifier, a TMGI, and a session identifier. For an SC-PTM transmission manner, the multicast service information may include one or more of the following: a TMGI, a session identifier, and a G-RNTI.

In some implementations of the first aspect, the configuration message is an RRC reconfiguration message.

According to a third aspect, a method for multicast communication is provided, and includes: A terminal device receives a configuration message from a first network device, where the configuration message indicates an association relationship between multicast service information and a first logical channel of the terminal device; and the terminal device receives, on the first logical channel based on the configuration message, a multicast service corresponding to the multicast service information, where the first network device has a packet data convergence protocol layer function, a service data adaptation protocol layer function, and a radio resource control layer function.

According to the method for multicast communication, the first network device may determine an association relationship between multicast service information and a logical channel of a terminal device, and may send the association relationship to the terminal device, so that a multicast service can be transmitted in a unicast manner based on the association relationship, thereby implementing flexible transmission of the multicast service.

In some implementations of the third aspect, the multicast service information includes one or more of the following: a multicast area identifier, a TMGI, a session identifier, and a G-RNTI.

In some implementations of the third aspect, the configuration message is an RRC reconfiguration message.

According to a fourth aspect, a method for multicast communication is provided, and includes: A first network device sends multicast service information to a second network device; the first network device receives, from the second network device, configuration information that is of a multicast control channel and that is determined based on the multicast service information; the first network device generates system information based on the configuration information, where the system information includes the configuration information; and the first network device sends the system information to the second network device, where the first network device has a packet data convergence protocol layer function, a service data adaptation protocol layer function, and a radio resource control layer function, and the second network device has a radio link control layer function, a media access control layer function, and a physical layer function.

It should be understood that in the method, the first network device is a CU, and the second network device is a DU. The two network devices may correspond to a same network device (namely, an access network device or a base station).

Optionally, the method may further include: The first network device sends, to the second network device, a multicast service type corresponding to the multicast service information. The multicast service type may be an MBMS or an SC-PTM.

Optionally, the method may further include: The first network device sends, to the second network device, a transport network layer (TNL) address on a first network device side corresponding to the multicast service information. The TNL address includes an IP address and a tunnel endpoint identifier (TEID).

According to the method for multicast communication, based on the multicast service information sent by the first network device, the second network device may determine corresponding configuration information of a multicast control channel and send the configuration information to the first network device, and the first network device may generate multicast-related system information based on the configuration information.

In some implementations of the fourth aspect, the system information is a system information block (SIB) 13 or SIB 20.

In some implementations of the fourth aspect, the multicast service information includes one or more of the following: a multicast area identifier, a temporary mobile group identity, a session identifier, and quality of service (QoS) information.

In some implementations of the fourth aspect, the configuration information includes one or more of the following: a repetition periodicity of the multicast control channel, an offset of the multicast control channel, a modification periodicity of the multicast control channel, subframe allocation information of the multicast control channel, MBSFN area configuration information, a notification indication, and a non-MB SFN area length.

In some implementations of the fourth aspect, that a first network device sends multicast service information to a second network device includes: The first network device sends a session start request message to the second network device, where the session start request message includes the multicast service information; or the first network device sends a session modification request message to the second network device, where the session modification request message includes the multicast service information.

According to a fifth aspect, a method for multicast communication is provided, and includes: A second network device receives multicast service information from a first network device; the second network device determines configuration information of a multicast control channel based on the multicast service information; the second network device sends the configuration information to the first network device; the second network device receives system information from the first network device, where the system information includes the configuration information; and the second network device broadcasts the system information, where the first network device has a packet data convergence protocol layer function, a service data adaptation protocol layer function, and a radio resource control layer function, and the second network device has a radio link control layer function, a media access control layer function, and a physical layer function.

It should be understood that in the method, the first network device is a CU, and the second network device is a DU. The two network devices may correspond to a same network device (namely, an access network device or a base station).

According to the method for multicast communication, based on the multicast service information sent by the first network device, the second network device may determine corresponding configuration information of a multicast control channel and send the configuration information to the first network device, and the first network device may generate multicast-related system information based on the configuration information.

In some implementations of the fifth aspect, the system information is a SIB 13 or a SIB 20.

In some implementations of the fifth aspect, the multicast service information includes one or more of the following: a multicast area identifier, a temporary mobile group identity, a session identifier, and QoS information.

In some implementations of the fifth aspect, the configuration information includes one or more of the following: a repetition periodicity of the multicast control channel, an offset of the multicast control channel, a modification periodicity of the multicast control channel, subframe allocation information of the multicast control channel, MBSFN area configuration information, a notification indication, and a non-MB SFN area length.

In some implementations of the fifth aspect, that a second network device receives multicast service information from a first network device includes: The second network device receives a session start request message from the first network device, where the session start request message includes the multicast service information; or the second network device receives a session modification request message from the first network device, where the session modification request message includes the multicast service information.

According to a sixth aspect, a method for multicast communication is provided, where the method includes: An integrated access and backhaul (IAB) node receives at least one piece of multicast service information from a first network device, where the at least one piece of multicast service information indicates at least one multicast service that the IAB node needs to monitor and multicast, and the first network device is a central unit Donor-CU of a donor node; the IAB node receives the at least one multicast service from a parent node of the IAB node based on the at least one piece of multicast service information; and the IAB node multicasts the at least one multicast service.

According to the method for multicast communication, the donor-CU (namely, a CU of the donor node) configures a multicast service that the IAB node needs to monitor and multicast, so that the IAB node can monitor and multicast the multicast service based on the configuration of the donor-CU, to implement multicast communication of an IAB architecture.

In some implementations of the sixth aspect, before the IAB node multicasts the at least one multicast service, the method further includes: The IAB node determines configuration information of a multicast control channel based on the at least one piece of multicast service information; the IAB node sends the configuration information of the multicast control channel to the first network device; the IAB node receives system information from the first network device, where the system information includes the configuration information of the multicast control channel; the IAB node broadcasts the system information; and the IAB node sends configuration information of at least one multicast traffic channel on the multicast control channel based on the configuration information of the multicast control channel, where the at least one multicast traffic channel is used to multicast the at least one multicast service.

In some implementations of the sixth aspect, the multicast service information includes one or more of the following: a temporary mobile group identity TMGI, a multimedia broadcast multicast service MBMS session identifier, a group radio network temporary identifier G-RNTI, and a logical channel identity.

In some implementations of the sixth aspect, the IAB node includes a mobile termination MT and a distributed unit DU; and that an integrated access and backhaul IAB node receives at least one piece of multicast service information from a first network device includes: The MT receives a radio resource control (RRC) message from the first network device, where the RRC message includes the at least one piece of multicast service information; or the DU receives a first interface message from the first network device, where the first interface message includes the at least one piece of multicast service information.

A first interface may be an F1 interface.

According to a seventh aspect, a method for multicast communication is provided, and includes: A first network device sends, to each integrated access and backhaul IAB node that is on a path from the first network device to a first terminal device, at least one piece of multicast service information corresponding to the IAB node, where the at least one piece of multicast service information indicates at least one multicast service that the corresponding IAB node needs to monitor and multicast, and the first network device is a central unit Donor-CU of a donor node; and the first network device sends, to a second network device, the at least one multicast service that the IAB node needs to monitor and multicast, where the second network device is a distributed unit Donor-DU of the donor node.

According to the method for multicast communication, the first network device (namely, a CU of the donor node) configures a multicast service that the IAB node needs to monitor and multicast, so that the IAB node can monitor and multicast the multicast service based on the configuration of the first network device, to implement multicast communication of an IAB architecture.

In some implementations of the seventh aspect, the method further includes: The first network device receives configuration information of a multicast control channel from each IAB node, where the configuration information of the multicast control channel of the IAB node is determined by the IAB node based on the at least one piece of corresponding multicast service information; the first network device determines system information of the IAB node based on the configuration information of the multicast control channel of the IAB node, where the system information of the IAB node includes the configuration information of the multicast control channel of the IAB node; and the first network device sends the system information to the IAB node.

In some implementations of the seventh aspect, the multicast service information includes one or more of the following: a TMGI, an MBMS session identifier, a G-RNTI, and a logical channel identity.

In some implementations of the seventh aspect, the IAB node includes a mobile termination MT and a distributed unit DU; and that a first network device sends, to each integrated access and backhaul IAB node, at least one piece of multicast service information corresponding to the IAB node includes: The MT sends an RRC message to the mobile termination of the IAB node, where the RRC message includes the at least one piece of multicast service information; or the DU sends a first interface message to the mobile termination of the IAB node, where the first interface message includes the at least one piece of multicast service information.

According to an eighth aspect, a method for multicast communication is provided, and includes: A second network device receives a first multicast service from a first network device, where the first multicast service includes a TNL address, the TNL address corresponds to the first multicast service, the first network device is a central unit Donor-CU of a donor node, and the second network device is a distributed unit Donor-DU of the donor node; and the second network device forwards the first multicast service to a next-hop IAB node based on first configuration information.

Optionally, the method further includes: When determining, based on the first configuration information, that the first multicast service needs to be multicast to a terminal device accessing the second network device, the second network device multicasts the first multicast service to the terminal device accessing the second network device.

According to the method for multicast communication, the donor-DU may forward and multicast the first multicast service based on the first configuration information.

In some implementations of the eighth aspect, that the DU forwards the first multicast service to a next-hop IAB node based on first configuration information includes: The DU adds, based on the first configuration information, routing information corresponding to the first multicast service to a backhaul adaptation protocol (BAP) header corresponding to the first multicast service, and determines a second link configuration based on the first configuration information; and the DU sends the first multicast service to the next-hop IAB node through a second link, where the BAP header corresponding to the first multicast service includes the routing information.

In some implementations of the eighth aspect, before a second network device receives a first multicast service from a first network device, the method further includes: The second network device receives the first configuration information from the first network device.

According to a ninth aspect, a method for multicast communication is provided, and includes: A first integrated access and backhaul IAB node receives a first multicast service; the first IAB node determines, based on second configuration information, whether the first multicast service needs to be forwarded to another IAB node; when the first multicast service needs to be forwarded to another IAB node, the first IAB node determines a next-hop IAB node and a first link based on the second configuration information; and the first IAB node forwards the first multicast service to the next-hop IAB node through the first link.

Optionally, the method further includes: The first IAB node determines, based on the second configuration information, whether the first multicast service needs to be multicast to a terminal device accessing the first IAB node; and when the first multicast service needs to be multicast to the terminal device accessing the first IAB node, the first IAB node multicasts the first multicast service on a multicast traffic channel corresponding to the first multicast service.

It should be understood that, the first IAB node is an intermediate IAB node on a path from a first network device to a first terminal device, in other words, the first IAB node is not an IAB node accessed by the first terminal device.

According to the method for multicast communication, the first IAB node may determine, based on the first configuration information, whether the received first multicast service needs to be forwarded, and when the received first multicast service needs to be forwarded, determine a next-hop IAB node and a corresponding link configuration, and forward the first multicast service based on the link configuration. The first IAB node may further multicast the first multicast service based on the first configuration information when determining that the first multicast service needs to be multicast (multicast through an air interface). In this way, sending of the first multicast service by the first IAB node is implemented.

In some implementations of the ninth aspect, before a first integrated access and backhaul IAB node receives a first multicast service, the method further includes: The first IAB node receives the second configuration information from a first network device, where the first network device is a central unit Donor-CU of a donor node.

In some implementations of the ninth aspect, that the first IAB node receives the second configuration information from a first network device includes: The first IAB node receives an RRC message from the first network device, where the RRC message includes the second configuration information; or the first IAB node receives a first interface message from the first network device, where the first interface message includes the second configuration information.

A first interface may be an F1 interface.

In some implementations of the ninth aspect, the second configuration information includes one or more of the following: multicast service information corresponding to the first multicast service, routing information, a BAP address of the next-hop node, a first link configuration, and an indication indicating whether multicast is required for the terminal device accessing the first IAB node; and the routing information includes a BAP address of a last-hop IAB node, and the routing information is used by the first IAB node to determine whether the first multicast service needs to be forwarded to another IAB node.

Optionally, the first link configuration is a logical channel that is between the first IAB node and the next-hop IAB node and that is used to forward the first multicast service.

In some implementations of the ninth aspect, the multicast service information includes one or more of the following: a temporary mobile group identity, a multimedia broadcast multicast service MBMS session identifier, a group radio network temporary identifier G-RNTI, and a logical channel identity.

According to a tenth aspect, a method for multicast communication is provided, and includes: A second integrated access and backhaul IAB node receives a first multicast service from a previous-hop IAB node, where the first multicast service includes a routing identifier and a multicast IP address; the second IAB node determines, based on the routing identifier, whether the first multicast service needs to be forwarded to another IAB node; when the first multicast service does not need to be forwarded, a first IAB node determines, based on the multicast IP address and third configuration information, a multicast traffic channel corresponding to the first multicast service, where the third configuration information indicates a correspondence between multicast service information of the first multicast service and the multicast IP address; and the first IAB node multicasts the first multicast service on the multicast traffic channel corresponding to the first multicast service.

The second IAB node may be a last-hop IAB node on a path from a first network device to a first terminal device, that is, an IAB node accessed by the first terminal device.

According to the method for multicast communication, after receiving the first multicast service, the second IAB node may determine, based on the third configuration information, the multicast traffic channel corresponding to the first multicast service. Therefore, the first multicast service may be multicast (multicast through an air interface) on the corresponding multicast traffic channel. In this way, multicast of the first multicast service by the second IAB node is implemented.

In some implementations of the tenth aspect, before a second integrated access and backhaul IAB node receives a first multicast service, the method further includes: The second IAB node receives the third configuration information from a first network device, where the first network device is a central unit Donor-CU of a donor node.

In some implementations of the tenth aspect, that the second IAB node receives the third configuration information from a central unit of a donor node, namely, a first network device includes: The second IAB node receives an RRC message from the first network device, where the RRC message includes the third configuration information; or the second IAB node receives a first interface message from the first network device, where the first interface message includes the third configuration information.

In some implementations of the tenth aspect, the multicast service information includes one or more of the following: a temporary mobile group identity, a multimedia broadcast multicast service MBMS session identifier, a group radio network temporary identifier G-RNTI, and a logical channel identity.

According to an eleventh aspect, another method for multicast communication is provided, and includes: A first network device sends first configuration information to a second network device, sends second configuration information to each first IAB node that is on a path from the first network device to a first terminal device, and sends third configuration information to a third IAB node, where the first network device is a central unit Donor-CU of a donor node, and the second network device is a distributed unit Donor-DU of the donor node, where the first configuration information, the second configuration information, and the third configuration information are used to send a first multicast service; the first configuration information is used by the second network device to determine whether the first multicast service needs to be multicast to a terminal device accessing the second network device, determine a first IAB node receiving the first multicast service, and determine a configuration of a link used to send the first multicast service to the first IAB node receiving the first multicast service; the second configuration information is used by the first IAB node to determine whether the first multicast service needs to be multicast to a terminal device accessing the first IAB node, determine another first IAB node receiving the first multicast service, and determine a configuration of a link used to send the first multicast service to the another first IAB node receiving the first multicast service; and the third configuration information is used by a second IAB node to determine a multicast traffic channel corresponding to the first multicast service.

It should be noted that, the first IAB node is an intermediate IAB node, and the second IAB node is a last-hop IAB node.

According to the method for multicast communication, the donor-CU configures, for the donor-DU, the intermediate IAB node, and the last-hop IAB node, corresponding configuration information used for multicast, so that the donor-DU, the intermediate IAB node, and the last-hop IAB node can multicast a multicast service based on the corresponding configuration information.

According to a twelfth aspect, a communication apparatus is provided, and includes modules or units configured to perform the method in any one of the first aspect to the eleventh aspect or the possible implementations of the first aspect to the eleventh aspect.

According to a thirteenth aspect, an apparatus is provided, and includes a processor. The processor is coupled to a memory, and may be configured to execute instructions in the memory, to enable the apparatus to perform the method in any one of the first aspect to the eleventh aspect or the possible implementations of the first aspect to the eleventh aspect. Optionally, the apparatus further includes the memory. Optionally, the apparatus further includes an interface circuit, and the processor is coupled to the interface circuit.

According to a fourteenth aspect, a processor is provided, and includes an input circuit, an output circuit, and a processing circuit. The processing circuit is configured to: receive a signal through the input circuit, and transmit a signal through the output circuit, so that the processor performs the method in any one of the first aspect to the eleventh aspect or the possible implementations of the first aspect to the eleventh aspect.

In an implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Implementations of the processor and the circuits are not limited in the embodiments.

According to a fifteenth aspect, a processing apparatus is provided, and includes a processor and a memory. The processor is configured to read instructions stored in the memory, and may receive a signal by using a receiver, and transmit a signal by using a transmitter, to perform the method in any one of the first aspect to the eleventh aspect or the possible implementations of the first aspect to the eleventh aspect.

Optionally, there are one or more processors, and there are one or more memories.

Optionally, the memory may be integrated with the processor, or the memory and the processor are separately disposed.

In an implementation process, the memory may be a non-transitory memory, for example, a read-only memory (ROM). The memory and the processor may be integrated on a same chip, or may be separately disposed on different chips. A type of the memory and a manner of disposing the memory and the processor are not limited in this embodiment.

It should be understood that, a related signal exchange process, for example, sending a downlink channel, may be a process of outputting a downlink channel by the processor. A signal output by the processor may be output to the transmitter and an input signal received by the processor may be from the receiver. The transmitter and the receiver may be collectively referred to as a transceiver.

The processing apparatus in the fifteenth aspect may be a chip. The processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may exist independently outside the processor.

According to a sixteenth aspect, a computer program product is provided. The computer program product includes a computer program (which may also be referred to as code or instructions). When the computer program is run, a computer is enabled to perform the method in any one of the first aspect to the eleventh aspect or the possible implementations of the first aspect to the eleventh aspect.

According to a seventeenth aspect, a computer-readable medium is provided. The computer-readable medium stores a computer program (which may also be referred to as code or an instruction). When the computer program is run on a computer, the computer is enabled to perform the method in any one of the first aspect to the eleventh aspect or the possible implementations of the first aspect to the eleventh aspect.

DETAILED DESCRIPTION OF THE EMBODIMENTS

Figure 1:
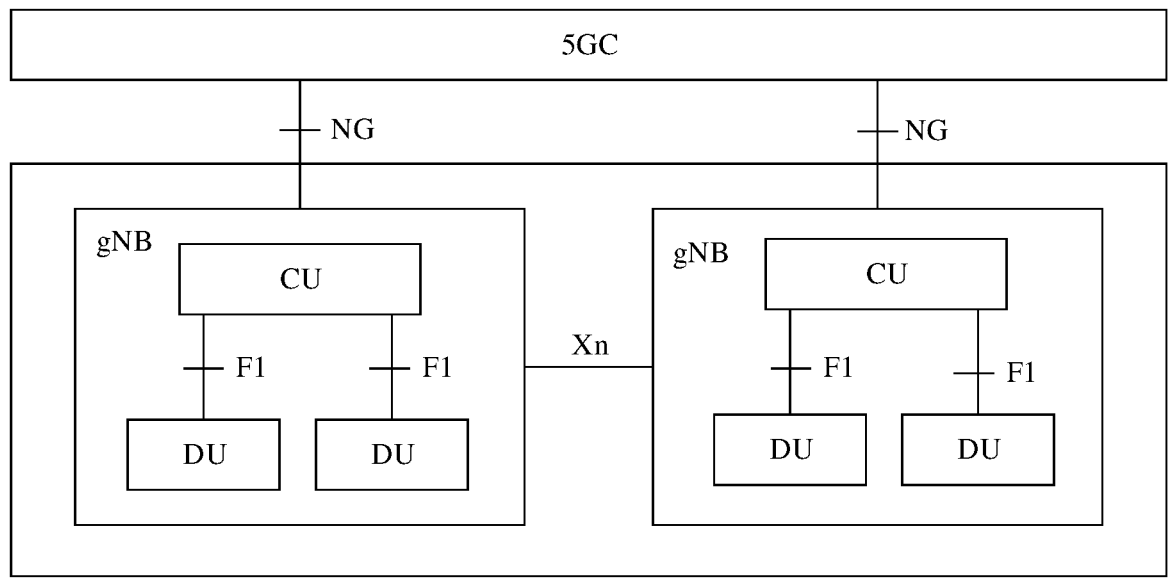
FIG. 1 is a schematic diagram of a CU-DU architecture.

The following describes the embodiments with reference to the accompanying drawings.

Unless otherwise stated, "/" means "or". For example, A/B may represent A or B. A term "and/or" may describe an association relationship between associated objects and indicates that there may be three relationships. For example, A and/or B may represent the following three cases: only A exists, both A and B exist, and only B exists. In addition, unless otherwise specified, "a plurality of" means two or more than two. In addition, for convenience of clear description of the embodiments, terms such as "first" and "second" are used to distinguish between same objects or similar objects whose functions and purposes are basically the same. A person skilled in the art may understand that the terms such as "first" and "second" do not constitute a limitation on a quantity or an execution sequence, and that the terms such as "first" and "second" do not indicate a definite difference.

Names of all nodes and messages are merely names that are set for ease of description, and names in an actual network may be different. It should not be understood that names of various nodes and messages are limited. On the contrary, any name having a function the same as or similar to that of a node or a message is considered as a method or an equivalent replacement, and shall fall within the scope of the embodiments. Details are not described below.

The embodiments may be applied to various communication systems, for example, a worldwide interoperability for microwave access (WiMAX) communication system, new radio (NR) in a 5th generation (5G) system, or another communication system that may appear in the future.

A terminal device in the embodiments may also be referred to as user equipment (UE), an access terminal, a subscriber unit, a subscriber station, a mobile station, a remote station, a remote terminal, a mobile device, a user terminal, a terminal, a wireless communication device, a user agent, a user apparatus, or the like. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like. This is not limited in the embodiments.

A network device in the embodiments may be a device configured to communicate with a terminal device. For example, the network device may be a base station, an evolved NodeB (eNodeB), a transmission reception point (TRP), a next generation NodeB (gNB) in a 5G mobile communication system, a base station in a future mobile communication system or an access node in a Wi-Fi system, a radio controller in a cloud radio access network (CRAN) scenario, a relay station, an access point, a vehicle-mounted device, a wearable device, a network device in another future evolved communication system, or the like. A technology and a device form that are used by the network device are not limited.

In some communication systems, for example, in a 5G communication system, a network device may be divided into a CU and a DU based on logical functions. The following uses an example in which the network device is a gNB for detailed description.

FIG. 1 is a schematic diagram of a CU-DU architecture. gNBs are connected through an Xn interface. The gNB is connected to a 5G core (5GC) network through an NG interface. The gNB may include a CU and a DU. In other words, functions of the gNB are separated, some functions of the gNB are deployed on one CU, and remaining functions are deployed on the DU. The CU may be connected to the DU through an F1 interface, and the F1 interface supports a user plane protocol (F1-U/F1*-U) and a control plane protocol (F1-C/F1*-C). The CU indicates that the gNB is connected to the core network through the NG interface, and the CU indicates that the gNB is connected to another gNB through the Xn interface. The CU and the DU may be physically separated or deployed together. A plurality of DUs may share one CU.

The CU and the DU may be divided based on protocol stacks. In a possible manner, a radio resource control (RRC) layer, a service data adaptation protocol (SDAP) layer, and a packet data convergence protocol (PDCP) layer are deployed on the CU, and a radio link control (RLC) layer, a media access control (MAC) layer, and a physical (PHY) layer are deployed on the DU. It may be understood that, the foregoing division is merely an example, and division into the CU and the DU may alternatively be performed in another manner. For example, some functions of the RLC layer and functions of protocol layers above the RLC layer are set on the CU, and remaining functions of the RLC layer and functions of protocol layers below the RLC layer are set on the DU. For another example, functions of the CU or the DU may alternatively be obtained through division based on a service type or another system requirement. For example, division is performed based on a latency, a function whose processing time needs to satisfy a latency requirement is disposed on the DU, and a function whose processing time does not need to satisfy the latency requirement is disposed on the CU. In addition, the CU may alternatively be in a form in which a control plane (CP) is separated from a user plane (UP). For example, the CU may include one CU-CP and one or more CU-UPs. It should be understood that, functions of the CU and the DU may be set as required during implementation. This is not limited in the embodiments.

It should be understood that, the names of the interfaces between units described in the foregoing and the following are merely examples. During implementation, the names of the interfaces may be other names. This is not limited. For example, an interface between gNBs may be referred to as an Xn interface, or may have another name. An interface between the CU and the DU may be referred to as an F1 interface, or may have another name.

Sending/forwarding/multicasting a multicast service refers to sending/forwarding/multicasting multicast data of the multicast service.

To effectively utilize mobile network resources, a multimedia broadcast multicast service (MBMS) is introduced in the 3rd generation partnership project (3GPP). The service is a technology for transmitting data from one data source to a plurality of targets, to implement network resource sharing and improve utilization of resources, such as air interface resources. The MBMS service may be transmitted in an MBSFN transmission manner or a single-cell point-to-multipoint (SC-PTM) transmission manner. In the MBSFN transmission manner, synchronous transmission is required to be simultaneously performed in all cells in an MBSFN area at the same frequency. In the SC-PTM transmission manner, multicast is performed in a single cell. The MBSFN area refers to a group of cells in which MBSFN transmission is implemented through coordination.

The MBSFN transmission manner relates to two types of logical channels:

(1) a multicast traffic channel (MTCH), and (2) a multicast control channel (MCCH).

The MTCH is used to carry data of at least one MBMS service. One MBSFN area needs to provide a large quantity of MBMS services. Therefore, a plurality of MTCHs may need to be configured.

The MCCH is used to carry configuration information of one MBSFN area and configuration information of an MBMS service provided in the MBSFN area.

The MCCH and one or more MTCHs may be multiplexed and mapped onto a transport channel multicast channel (MCH), and the MCH is mapped onto a physical multicast channel (PMCH) and transmitted on an MBSFN subframe.

In the MBSFN transmission manner, a DU broadcasts, in a broadcast message, for example, a system information block (SIB) 13, configuration information of an MCCH of each MBSFN area in a cell. Then, the DU transmits, on the MCCH, the configuration information of the MBSFN area and configuration information of an MBMS service provided in the MBSFN area. Then, the DU may multicast the MBMS service on the MTCH (or the PMCH). Correspondingly, a terminal device obtains the configuration information of the MCCH of each MBSFN area by receiving the broadcast message, then monitors the MCCH based on the configuration information of the MCCH, obtains, from the MCCH, the configuration information of an MBMS service provided in the MBSFN area, selects an MBMS service that the terminal device is interested in, and monitors the MBMS service on the MTCH based on the configuration information of the MBMS service.

The SC-PTM transmission manner relates to two types of logical channels:
(1) a single-cell multicast control channel (SC-MCCH), and
(2) a single-cell multicast traffic channel (SC-MTCH).

The SC-MTCH is used to carry one MBMS service. If a large quantity of MBMS services need to be provided in one cell, a plurality of SC-MTCHs need to be configured.

The SC-MTCH is used to carry configuration information of an MBMS service provided in one cell.

The SC-MCCH and one or more SC-MTCHs may be multiplexed and mapped to a downlink shared channel (DL-SCH), and the DL-SCH is mapped to a physical downlink shared channel (PDSCH).

In the SC-PTM transmission manner, a DU first broadcasts configuration information of the SC-MCCH in a broadcast message, for example, a SIB 20. Then, the DU transmits, on the SC-MCCH channel, control information required for receiving the SC-MTCH. For example, the control information may include configuration information of the SC-MTCH. Then, the DU may multicast the MBMS service on the SC-MTCH. Correspondingly, a terminal device obtains the configuration information of the SC-MCCH by receiving the broadcast message, then monitors the SC-MCCH based on the configuration information of the SC-MCCH, obtains, from the SC-MCCH, the control information required for receiving the SC-MTCH, selects, based on the control information, an MBMS service that the terminal device is interested in, and monitors the MSMS service on an SC-MTCH that the terminal device is interested in.

At the current stage, a hybrid multicast-unicast mechanism is discussed. Based on this mechanism, multicast service data may be sent to the terminal device in a unicast manner, or may be sent to the terminal device in a multicast manner.

Figure 2:
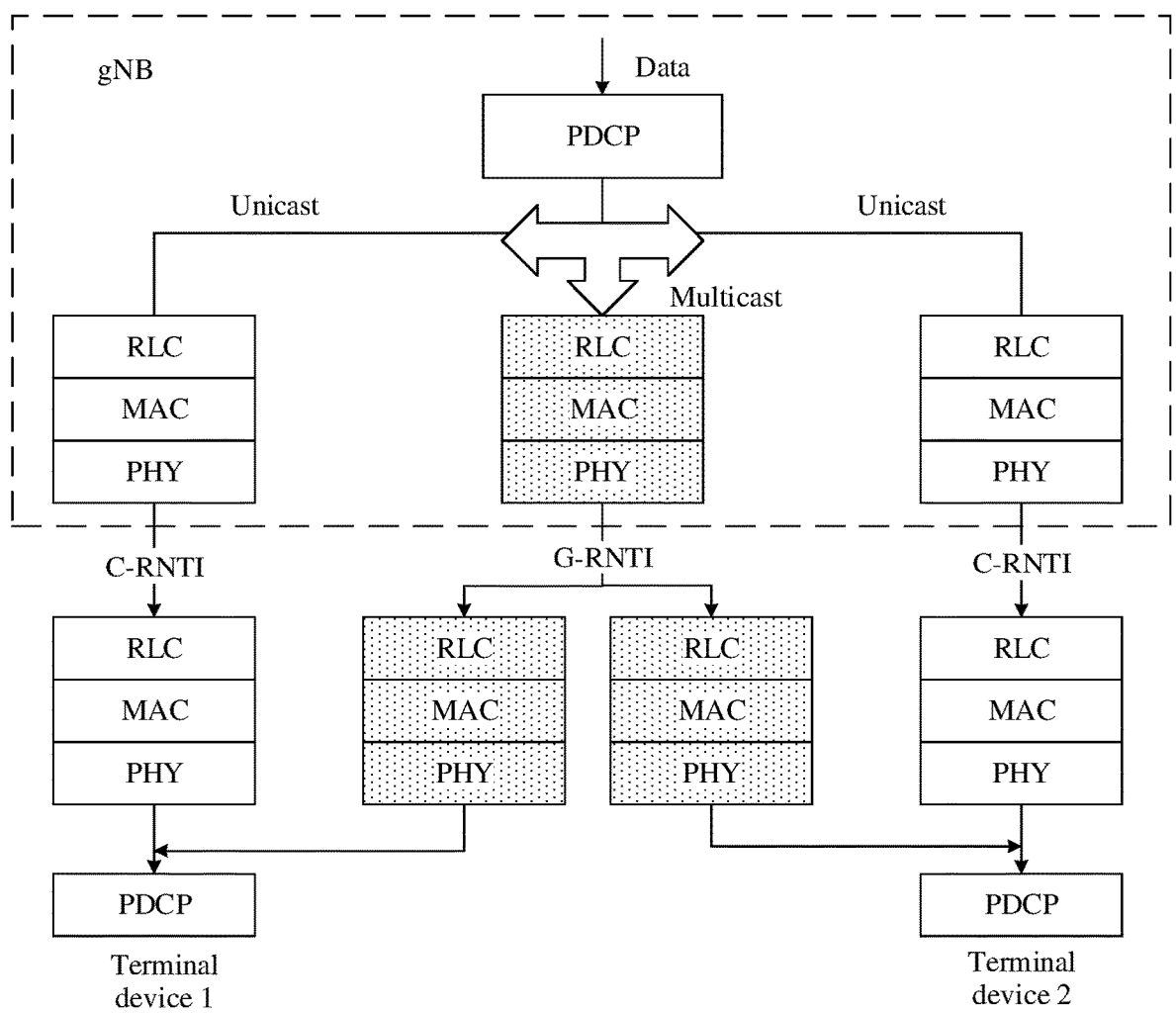
FIG. 2 is a schematic diagram of a hybrid multicast-unicast mechanism.

FIG. 2 is a schematic diagram of a hybrid multicast-unicast mechanism. Unicast and multicast anchors are on a same PDCP entity, and a terminal device may identify, based on a cell radio network temporary identifier (C-RNTI) and a group radio network temporary identifier (G-RNTI), whether to use a unicast manner or a multicast manner. It should be understood that, that unicast and multicast anchors are on a same PDCP entity is merely an implementation of the hybrid multicast-unicast mechanism. In practice, the unicast and multicast anchors may be on different PDCP entities.

Currently, there is no related technology to implement transmitting a multicast service in a unicast manner in a CU-DU architecture.

In view of this, the embodiments may provide a multicast method to implement transmitting the multicast service in the unicast manner in the CU-DU architecture. The following describes the method in detail.

Figure 3:
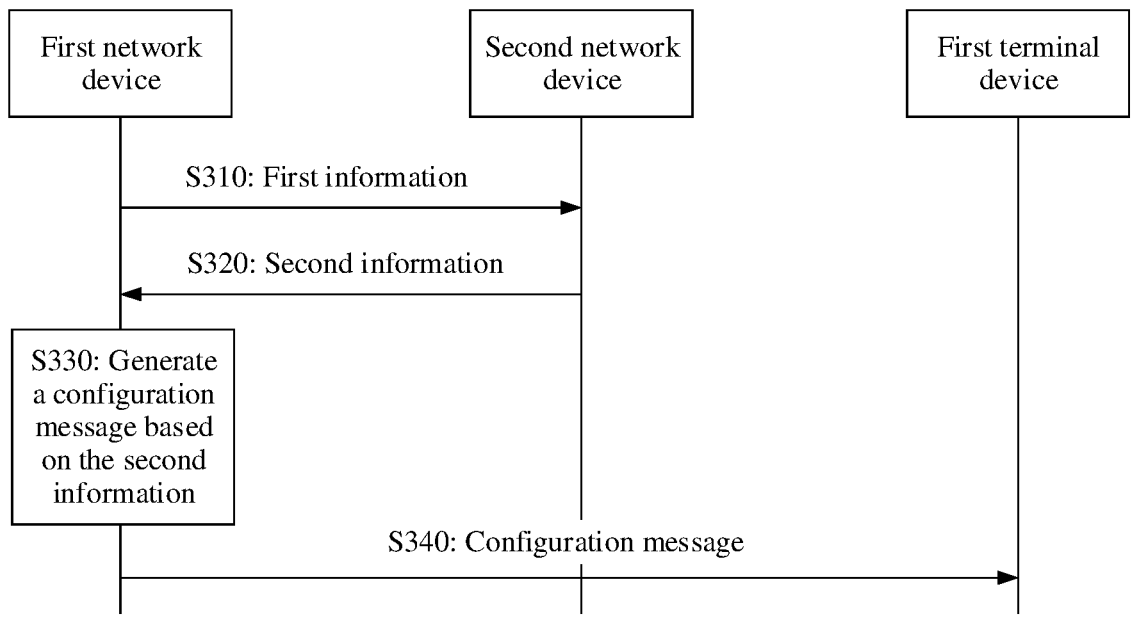
FIG. 3 is a schematic flowchart of a method for multicast communication.

FIG. 3 is a schematic flowchart of a method for multicast communication. The following describes steps in the method 300.

S310: A first network device sends first information to a second network device.

Correspondingly, the second network device receives the first information.

The first network device is a CU, and the second network device is a DU. The CU and the DU may correspond to a same access network device or a same base station. The CU has a packet data convergence protocol layer function, a service data adaptation protocol layer function, and a radio resource control layer function of the access network device. The CU has a radio link control layer function, a media access control layer function, and a physical layer function of the access network device.

The first information indicates an association relationship between multicast service information and a first terminal device. In other words, the first information indicates that the multicast service information is associated with the first terminal device. The DU may determine, based on the first information, that the first terminal device needs to monitor a multicast service indicated by the multicast service information.

The multicast service information indicates a multicast service, namely, an MBMS service. For example, the multicast service information may include one or more of the following: a multicast area identifier, a temporary mobile group identity (TMGI), a session identifier, and a group radio network temporary identifier (G-RNTI). In other words, a combination of one or more of the foregoing may be used to identify the multicast service. For example, for an MBSFN, the multicast service information may include one or more of the following: the multicast area identifier, the TMGI, and the session identifier. For an SC-PTM, the multicast service information may include one or more of the following: the TMGI, the session identifier, and the G-RNTI.

A multicast area is an MBSFN area.

The session identifier is an MBMS session identifier (namely, an MBMS session ID). One TMGI or one MBMS session corresponds to one MBMS service, or one TMGI and one MBMS session correspond to one MBMS service.

The G-RNTI is used to scramble/descramble the multicast service. One G-RNTI corresponds to one SC-MTCH, and one SC-MTCH corresponds to one multicast service.

Optionally, the first information may be implemented in the following two manners.

Manner 1

The first information may include the multicast service information and information about at least one terminal device associated with the multicast service information, and the at least one terminal device includes the first terminal device. Information about one terminal device indicates the terminal device.

The first terminal device is used as an example. For example, information about the first terminal device may be a combination of one or more of the following: a C-RNTI, a gNB-CU UE F1 AP ID, and a gNB-DU UE F1 AP ID. The C-RNTI is an identifier used by a network device to identify the first terminal device on an air interface and is used to scramble/descramble the information about the first terminal device. The gNB-CU UE F1 AP ID represents an identifier used by the CU to identify the first terminal device on an F1 interface, and the gNB-DU UE F1 AP ID represents an identifier used by a DU side to identify the first terminal device on the F1 interface. It should be understood that, the information about the first terminal device may alternatively be another identifier used by the CU and the DU to identify the first terminal device.

For example, the first information may include or may be the following information elements:
>multicast service information
>UE ID list
>>UE ID>
>DRB ID The multicast service information may be a combination of one or more of the TMGI, the MBMS session ID, and the G-RNTI. The UE ID list is the information about the at least one terminal device associated with the multicast service information, and information about how each terminal device is represented by the UE ID. The UE ID may be the C-RNTI, the gNB-CU UE F1 AP ID, the gNB-DU UE F1 AP ID, or the like. Optionally, the first information may further include a DRB ID corresponding to each terminal device corresponding to the multicast service.

It should be understood that, for possible forms of the multicast service information and the UE ID below, refer to the descriptions herein. Details are not described below again.

Optionally, the first information may be carried in an interface message between the CU and the DU, for example, carried in a session start/modification request message. The session start/modification request message is unassociated with the terminal device, that is, the message is non-UE associated signaling.

Manner 2

The first information may include an association relationship between a first DRB of the first terminal device and the multicast service information. The DU may determine, based on the first information, that the first DRB transmits the multicast service corresponding to the multicast service information.

For example, the first information may include or may be the following information elements:
DRB to Be Setup List
>>DRB ID>
>multicast service information DRB to Be Setup List represents a DRB that the first terminal device needs to set up and may include the first DRB. The DRB ID is an identifier of a DRB.

Optionally, the first information may be carried in an interface message between the CU and the DU, for example, carried in a context setup or modification request message to the first terminal device. The message is associated with the terminal device, that is, the message is UE-associated signaling.

S320: The second network device sends second information to the first network device. Correspondingly, the first network device receives the second information.

After receiving the first information, the DU may determine the second information based on the first information and may send the second information to the CU.

When the first information is implemented in the foregoing Manner 1, the second information may indicate an association relationship between the multicast service information and a first logical channel In other words, the second information may indicate the first logical channel associated with the multicast service information. After the multicast service information is associated with the first logical channel, the DU may transmit, to the first terminal device through the first logical channel, the multicast service corresponding to the multicast service information.

For example, the second information may include the following information elements:
>multicast service information
>>logicalChannelIdentity logicalChannelIdentity is an identity of the first logical channel that is of the first terminal device and that is associated with the multicast service information, and the first logical channel corresponds to the first DRB. Optionally, the second information may further carry a DRB ID corresponding to logicalChannelIdentity.

For example, the multicast service information and the identity of the associated first logical channel may be included in a cell group configuration (CellGroupConfig) corresponding to the first terminal device.

It should be understood that, for CellGroupConfig below, refer to the descriptions herein. Details are not described below again.

The second information may further indicate an association relationship between the multicast service information and a logical channel of another terminal device in the at least one terminal device associated with the multicast service information. For example, the second information may further indicate an association relationship between the multicast service information and a second logical channel of a second terminal device associated with the multicast service information. After the multicast service information is associated with the second logical channel, the DU may transmit, to the second terminal device through the second logical channel, the multicast service corresponding to the multicast service information.

For example, the second information may include or may be the following information elements:
>UE configuration List
>>UE ID>
>CellGroupConfig UE configuration List includes an identifier of the first terminal device.

Alternatively, the second information may not include the UE ID. In this case, a sequence of CellGroupConfig in UE configuration List corresponds to a sequence of information about the terminal device in the first information. For example, if the information about the at least one terminal device in the first information is successively a UE ID #1, a UE ID #2, and a UE ID #3, CellGroupConfig in UE configuration List in the second information is successively CellGroupConfig #1, CellGroupConfig #2, and CellGroupConfig #3. CellGroupConfig #1 corresponds to the UE ID #1, CellGroupConfig #2 corresponds to the UE ID #2, and CellGroupConfig #3 corresponds to the UE ID #3.

Optionally, the second information may be carried in an interface message between the CU and the DU, for example, carried in a session start/modification response message.

When the first information is implemented in the foregoing Manner 2, the second information may indicate an association relationship between the first DRB and a first logical channel of the first terminal device. For example, the second information may include an identifier of the first DRB and an identity of the associated first logical channel. The second information may further include an identifier of another DRB of the first terminal device and an identity of an associated logical channel Optionally, the second information may be carried in an interface message between the CU and the DU, for example, carried in a context setup or modification response message to the first terminal device.

S330: The first network device generates a configuration message based on the second information.

The configuration message may indicate the association relationship between the multicast service information and the first logical channel. In other words, the configuration message indicates that the multicast service information is associated with the first logical channel. In addition, the configuration message may further include an SDAP configuration/a PDCP configuration on a CU side.

For example, the CU may generate a corresponding configuration message for each terminal device based on the second information. For example, as described above, in S320, the DU separately provides CellGroupConfig #1, CellGroupConfig #2, and CellGroupConfig #3 corresponding to the UE #1, the UE #2, and the UE #3. In this case, the CU generates a corresponding configuration message for the UE #1, where the configuration message includes CellGroupConfig #1. Similarly, corresponding configuration messages generated for the UE #2 and the UE #2 respectively include CellGroupConfig #2 and CellGroupConfig #3.

For example, when the first information is implemented in Manner 1, the CU may determine, based on the second information, that a logical channel that is of the first terminal device and that is associated with the multicast service information is a first logical channel, and may further generate a configuration message, where the configuration message may include the multicast service information and an identity of the associated first logical channel For example, when the first information is implemented in Manner 2, the CU may learn, based on the second information, that the first DRB is associated with a first logical channel of the first terminal device, and may further determine that the multicast service information is associated with the first logical channel, to generate a configuration message, where the configuration message may include the multicast service message and an identity of the associated first logical channel.

S340: The first network device sends the configuration message to the first terminal device. Correspondingly, the first terminal device receives the configuration message.

After receiving the configuration message, the first terminal device may determine that the multicast service is associated with the first logical channel Subsequently, after receiving, from a first CU, the multicast service corresponding to the multicast service information, the DU may map the multicast service onto the first logical channel. Correspondingly, the first terminal device may receive, on the first logical channel, the multicast service corresponding to the multicast service information.

For example, as shown in FIG. 2, the DU maps the multicast service onto a corresponding multicast traffic channel to perform multicast. After receiving the multicast service, the first terminal device delivers, based on a mapping relationship between the multicast service information and the first logical channel, the multicast service received on the multicast traffic channel to a PDCP entity corresponding to the first logical channel.

Figure 4:
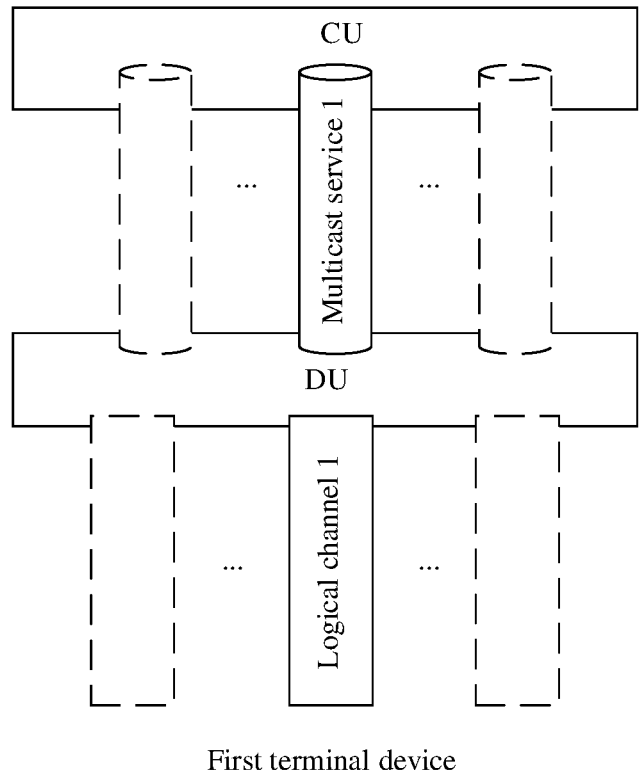
FIG. 4 is an example diagram of a correspondence between a logical channel of a terminal device and a multicast service.

For another example, refer to FIG. 4. A multicast service 1 corresponds to a logical channel 1 of the first terminal device. After the CU sends the multicast service 1 to the DU, the DU maps the multicast service 1 onto the logical channel 1 to transmit the multicast service 1 to the first terminal device.

Optionally, the configuration message may be an RRC reconfiguration message.

In conclusion, according to the method, through interaction between the CU and the DU, multicast service information may be associated with a logical channel of a terminal device, so that a multicast service can be transmitted in a unicast manner, thereby implementing flexible transmission of the multicast service.

In a CU-DU architecture, multicast-related system information belongs to other system information, namely, other SI, for example, a SIB 13 and a SIB 20. The system information is generated by the CU and sent to the DU, and the DU broadcasts the system information. However, how the CU generates the system information has not been recorded currently.

In view of this, the embodiments may provide a method for multicast communication. A DU may provide configuration information of a multicast control channel for a CU, and the CU may generate multicast-related system information based on the configuration information. The following describes the method in detail.

Figure 5:
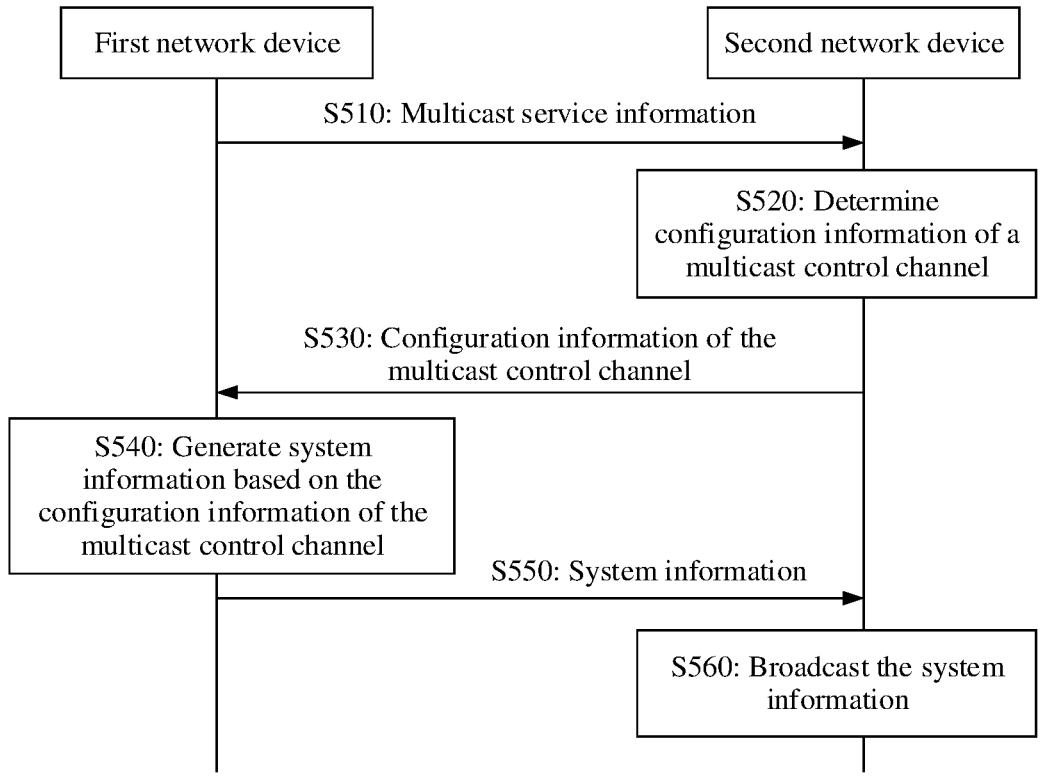
FIG. 5 is a schematic flowchart of another method for multicast communication.

FIG. 5 is a schematic flowchart of a method for multicast communication. The following describes steps in the method 500.

S510: A first network device sends multicast service information to a second network device. Correspondingly, a DU receives the multicast service information.

The first network device is a CU, and the second network device is the DU. The CU and the DU may correspond to a same access network device or a same base station. The CU has a packet data convergence protocol layer function, a service data adaptation protocol layer function, and a radio resource control layer function of the access network device. The CU has a radio link control layer function, a media access control layer function, and a physical layer function of the access network device. The multicast service information indicates a multicast service. For a possible form of the multicast service information, refer to the foregoing descriptions. Details are not described herein again.

Optionally, the CU may further send, to the DU, a multicast service type corresponding to the multicast service information, that is, an MBMS or an SC-PTM.

Optionally, the multicast service information may be carried in an interface message, for example, a session start/modification request message, between the CU and the DU. In addition to the multicast service information, the session start/modification request message may further carry CU-side transport network layer (TNL) address information corresponding to each multicast service. The TNL address information includes an IP address and a tunnel endpoint identifier (TEID).

S520: The second network device determines configuration information of a multicast control channel based on the multicast service information.

The configuration information of the multicast control channel may be associated with one or more multicast services. For example, at least one TMGI (or one TMGI and one MBMS session ID) corresponds (or correspond) to one piece of configuration information of the multicast control channel. If the CU provides the multicast service type corresponding to the multicast service information, the DU may further determine corresponding configuration information of the multicast control channel based on the multicast service type. For example, when the multicast service type is the MBMS type, the configuration information of the multicast control channel may include one or more of the following: a repetition periodicity of the multicast control channel, an offset of the multicast control channel, a modification periodicity of the multicast control channel, subframe allocation information of the multicast control channel, a signaling modulation and coding scheme, MBSFN area configuration information, a notification indication, a non-MBSFN area length, and the like. For example, when the multicast service type is the SC-PTM type, the configuration information of the multicast control channel may include one or more of the following: a repetition periodicity of the multicast control channel and an offset of the multicast control channel. The offset of the multicast control channel and the repetition periodicity of the multicast control channel are used to determine a start time point of the multicast control channel, and the offset of the multicast control channel is obtained by dividing a system frame number SFN by the repetition periodicity of the multicast control channel. The notification indication indicates which PDCCH bit is used to notify UE of a change of the multicast control channel. The non-MB SFN area length indicates a quantity of symbols at the beginning of a subframe that are used in a non-MBSFN area.

For example, for an MBSFN transmission manner, the multicast control channel may be an MCCH. For an SC-PTM transmission manner, the multicast control channel may be an SC-MCCH.

S530: The second network device sends the configuration information to the first network device. Correspondingly, the first network device receives the configuration information.

Optionally, the multicast service information may be carried in an interface message, for example, a session start/modification response message, between the CU and the DU. In addition to the configuration information corresponding to the multicast service information, the session start/modification request message may further carry DU-side TNL address information corresponding to each multicast service. The CU and the DU may set up a corresponding user plane tunnel for each multicast service based on the CU-side TNL address information and the DU-side TNL address information that are respectively provided by the CU and the DU.

S540: The first network device generates system information based on the configuration information. The system information includes the configuration information.

For example, for the MBSFN transmission manner, the CU may generate a SIB 13 based on the configuration information. For the SC-PTM transmission manner, the CU may generate a SIB 20 based on the configuration information.

S550: The first network device sends the system information to the second network device. Correspondingly, the second network device receives the system information.

For example, the CU may send the system information to the DU by using an interface message, for example, a CU configuration update request message, between the CU and the DU.

S560: The second network device broadcasts the system information.

After receiving the system information, the DU may broadcast the system information through an air interface based on a periodicity corresponding to the system message.

After that, the method may further include:

The DU sends, on the multicast control channel based on the configuration information of the multicast control channel, configuration information of a multicast traffic channel, for example, MBSFNAreaConfiguration or SCPTMConfiguration; the CU sends, to the DU, the multicast service indicated by the multicast service information; and the DU broadcasts the multicast service.

For content included in the configuration information of the multicast traffic channel, for example, MBSFNAreaConfiguration or SCPTMConfiguration, refer to the conventional technology. For example, for the MBSFN transmission manner, the configuration information of the multicast traffic channel may include one or more of the following: commonSF-Alloc, commonSF-AllocPeriod, and pmch-InfoList. commonSF-Alloc represents a subframe allocated to the MBSFN area. commonSF-AllocPeriod represents a periodicity of the subframe allocated to the MBSFN area. pmch-infoList includes a set of pieces of pmch-info. Each piece of pmch-info includes pmch-config, corresponding mbms-SessionInfoList, and the like. pmch-config includes sf-AllocEnd, dataMCS, and mch-SchedulingPeriod. sf-AllocEnd represents a last subframe allocated to a (P)MCH, dataMCS represents a modulation and coding scheme used by the multicast service, and Mch-SchedulingPeriod represents a scheduling periodicity of an MCH. mbms-SessionInfolist includes the TMGI, sessionId, logicalChannelIdentity, and the like. For the SC-PTM transmission manner, the configuration information SCPTMConfiguration of the multicast traffic channel may include sc-mtch-InfoList and scptm-NeighbourCellList. sc-mtch-InfoList includes a set of pieces of sc-mtch-info. Each piece of sc-mtch-info may include one or more of the following: mbmsSessionInfo (namely, MBMS session information), a G-RNTI, sc-mtch-schedulingInfo (namely, SC-MTCH scheduling information), and sc-mtch-neighborCell (namely, SC-MTCH scheduling cell information). mbmsSessionInfo includes the TMGI, and optionally, further includes mbmssessionId.

For details about how the DU multicasts the multicast service, refer to the related conventional technology. Details are not described herein again.

In conclusion, according to the method for multicast communication, the DU may determine, based on multicast service information sent by the CU, corresponding configuration information of a multicast control channel and send the configuration information to the CU, and the CU may generate multicast-related system information based on the configuration information.

An integrated access and backhaul (IAB) technology is introduced in a 5G system. In an IAB network based on the IAB technology, both an access link and a backhaul link use a wireless transmission solution to avoid fiber deployment.

In the IAB network, an IAB node may provide a wireless access service for a terminal device, and service data of the terminal device is transmitted by connecting the IAB node to a donor node through a wireless backhaul link. The IAB node may also be referred to as a relay node (RN), and the donor node may also be referred to as an IAB donor or a donor gNodeB (DgNB).

Figure 6:
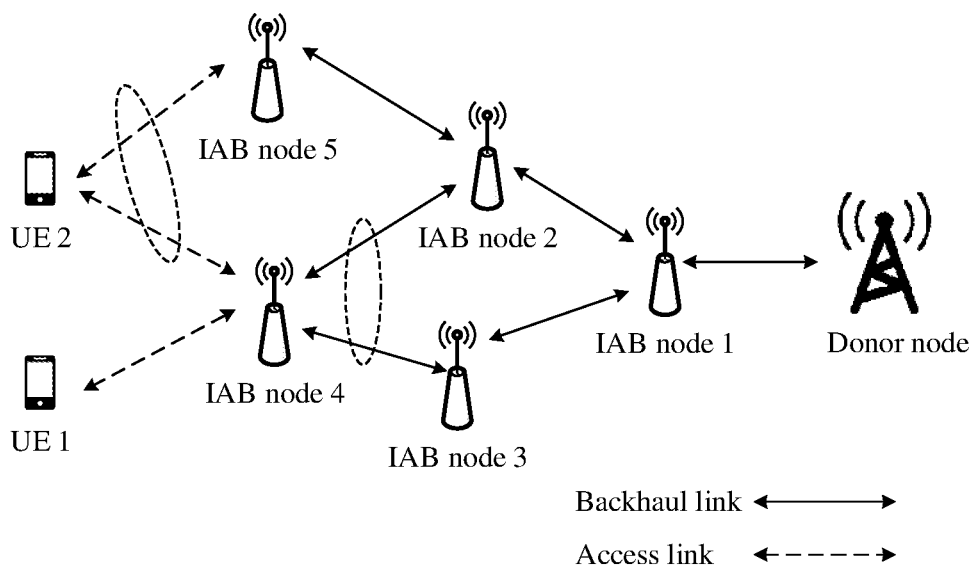
FIG. 6 is a schematic diagram of an IAB network topology.

FIG. 6 is a schematic diagram of an IAB network. A parent node of an IAB node 1 is a donor node, the IAB node 1 is a parent node of an IAB node 2 and an IAB node 3, both the IAB node 2 and the IAB node 3 are parent nodes of an IAB node 4, and a parent node of an IAB node 5 is the IAB node 3. An uplink data packet of UE may be transmitted to the donor node via one or more IAB nodes, and then sent by the donor node to a mobile gateway device (for example, a user plane function UPF unit in a 5G core network). A downlink data packet of the UE is received by the donor node from the mobile gateway device, and then sent to the UE through the IAB node. There are two available paths for data transmission between UE 1 and the donor node: a path 1: UE 1→IAB node 4—>IAB node 3→IAB node 1→donor node, and a path: UE 1→IAB node 4→IAB node 2—>IAB node 1—>donor node. There are three available paths for data packet transmission between UE 2 and the donor node: UE 2→IAB node 4→IAB node 3→IAB node 1→donor node, terminal 2→IAB node 4→IAB node 2→IAB node 1→donor node, and UE 2→IAB node 5→IAB node 2→IAB node 1→donor node.

It should be understood that, on a transmission path from the donor node to the UE, an IAB node accessed by the UE may be referred to as a last-hop IAB node, and another IAB node may be referred to as an intermediate IAB node. The following path is used as an example: donor node→IAB node 1→IAB node 3→IAB node 4→UE 1. The IAB node 4 may be referred to as a last-hop IAB node, a last-hop IAB node on the path from the donor node to the UE 1. Both the IAB node 3 and the IAB node 1 are intermediate IAB nodes, intermediate IAB nodes on the path from the donor node to the UE 1.

The IAB network shown in FIG. 6 may be merely an example of a networking manner, and a networking manner of the IAB network is not limited.

The IAB node may include an mobile termination (MT) part and a DU part. When the IAB node is oriented to a parent node of the IAB node, the IAB node may serve as a terminal device, that is, a role of the MT. When the IAB node is oriented to a child node of the IAB node (where the child node may be another IAB node or a common terminal device), the IAB node is considered as a network device, that is, a role of the DU.

The donor node may be a network device that has a function of a base station in an independent state, or may be a network device that has a function of a base station in a form in which a CU and a DU are separated. The donor node is connected to a core network (for example, connected to the 5G core network, 5GC) element that serves the terminal device, and provides a wireless backhaul function for the IAB node. For ease of description, in the following, a central unit of the donor node is referred to as a donor-CU for short, and a distributed unit of the donor node is referred to as a donor-DU for short. The donor-CU may be in a form in which a control plane and a user plane are separated.

Figure 7:
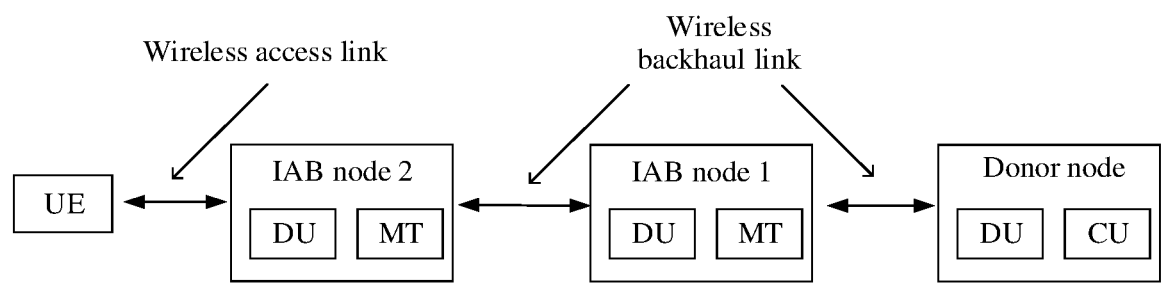
FIG. 7 is a schematic diagram of composition of an IAB node.

FIG. 7 is a schematic diagram of composition of an IAB node. UE is connected to a donor node via an IAB node 2 and an IAB node 1. The IAB node 1 and the IAB node 2 each include a DU part and an MT part. The DU part of the IAB node 2 provides an access service for the UE. The DU part of the IAB node 1 provides an access service for the MT part of the IAB node 2. The DU part of the IAB node 1 may also provide an access service for other UE within coverage of the IAB node 1. A DU part of the donor node provides an access service for the MT part of the IAB node 1.

An IAB technology introduces a new protocol layer, namely, a backhaul adaptation protocol (BAP) layer, to a wireless backhaul link. The protocol layer is located above a radio link control (RLC) layer, and may be used to implement functions such as routing and bearer mapping of a data packet on the wireless backhaul link.

An F1 interface needs to be set up between the IAB node (the DU part of the IAB node) and the donor node (or a donor-CU) through an air interface. The interface supports a user plane protocol (F1-U) and a control plane protocol (F1-C). It should be understood that, F1 may alternatively be replaced with F1* or another name. The name is not limited. In the embodiments, the name may be collectively referred to as F1.

Figure 8:
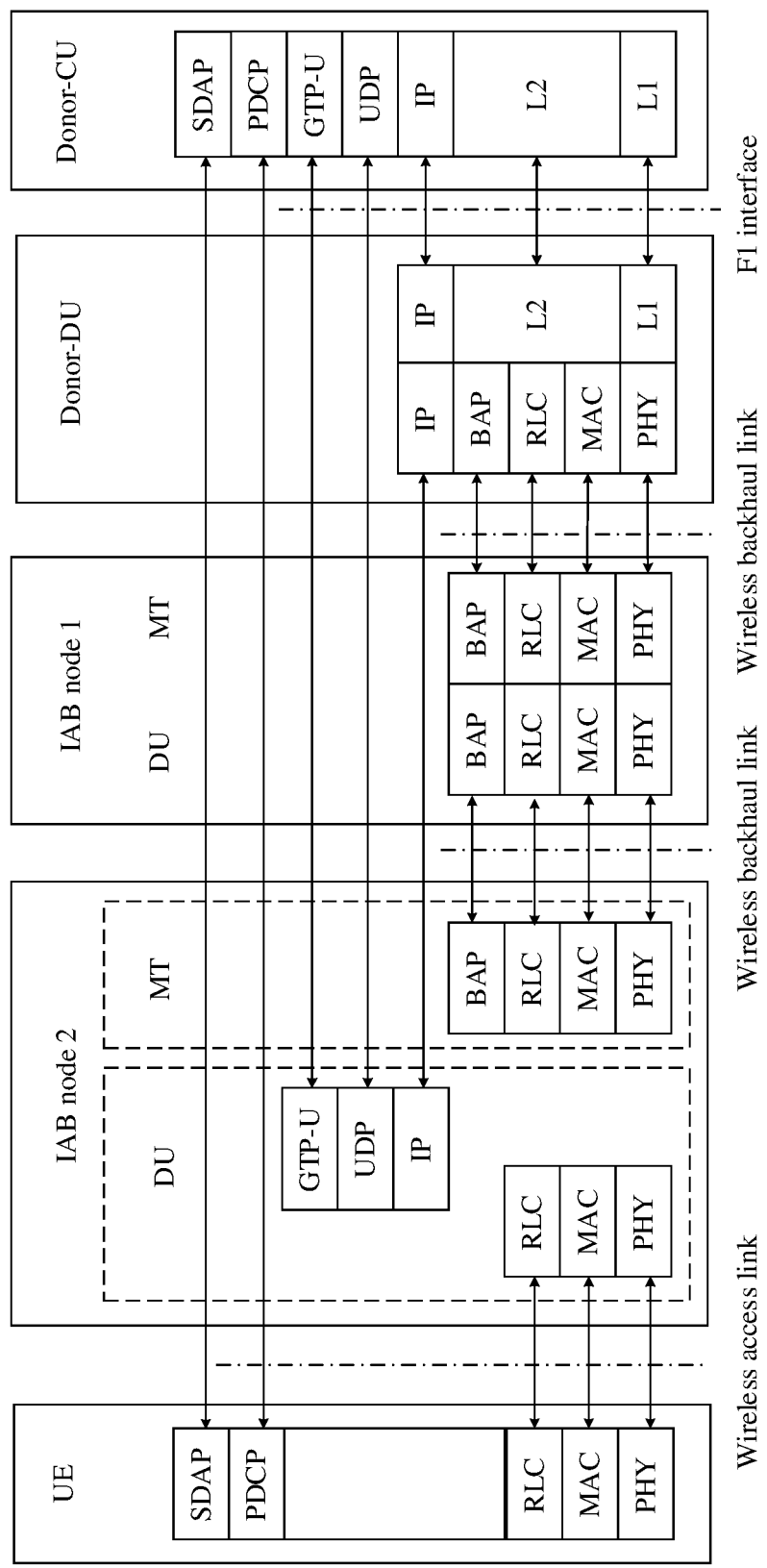
FIG. 8 shows an example of a user plane protocol stack architecture of an IAB network.

FIG. 8 shows an example of a user plane protocol stack architecture of an IAB network. In the protocol architecture shown in FIG. 8, protocol layers are: a service data adaptation protocol (SDAP) layer, a packet data convergence protocol (PDCP) layer, a general packet radio service tunneling protocol user plane (GTP-U) layer, a user datagram protocol (UDP) layer, an internet protocol (IP) layer, an L2 layer (layer 2), an L1 layer (layer 1), a radio link control (RLC) layer, a media access control (MAC) layer, and a physical (PHY) layer. The L2 layer is a link layer. For example, the L2 layer may be a data link layer in an open systems interconnection (OSI) reference model. The L1 layer may be a physical layer. For example, the L1 layer may be a physical layer in the OSI reference model.

Figure 9:
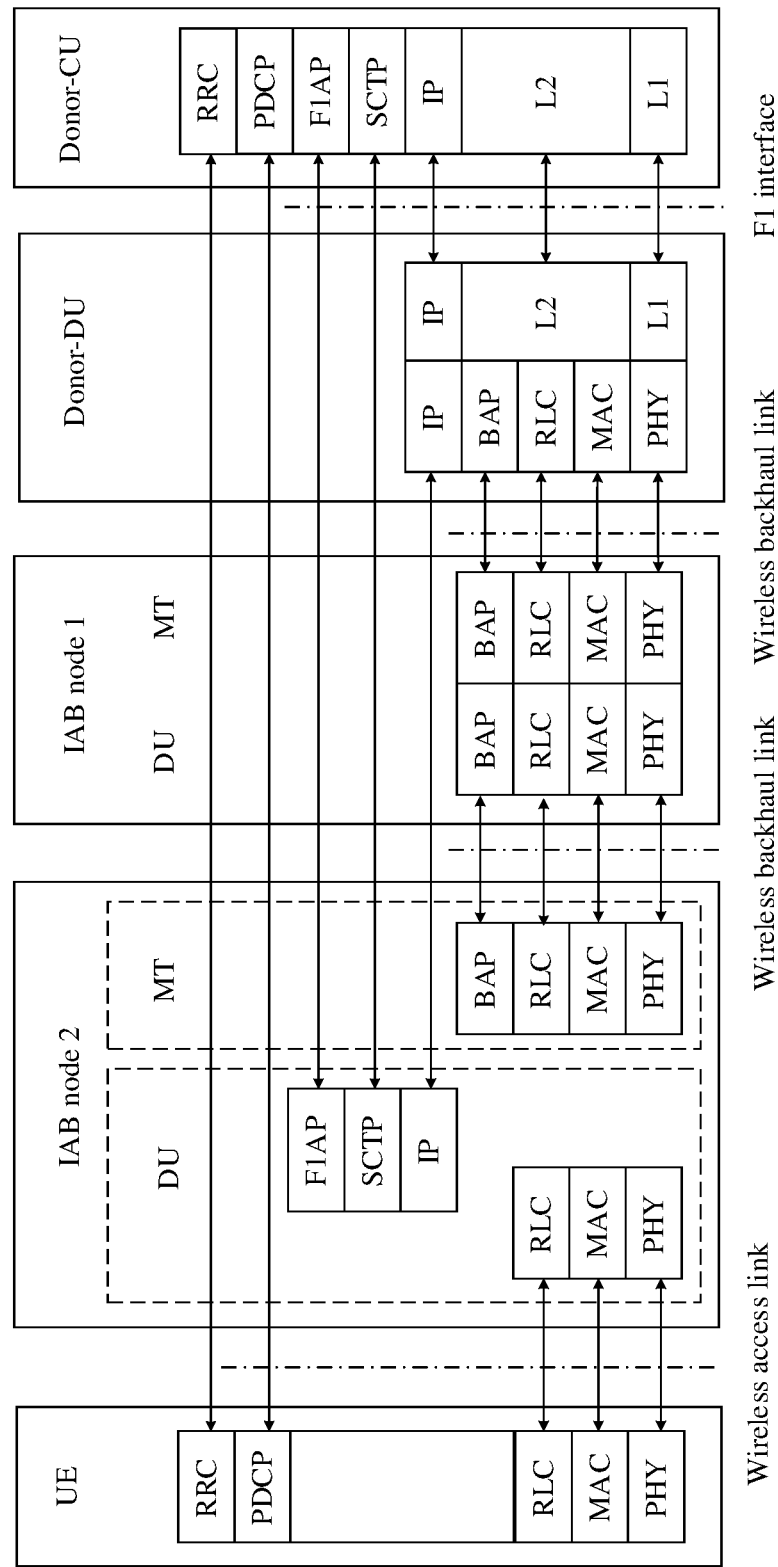
FIG. 9 shows an example of a control plane protocol stack architecture of an IAB network.

FIG. 9 shows an example of a control plane protocol stack architecture of an IAB network. The descriptions of the protocol layers in FIG. 8 are also applicable to FIG. 9, but there are some differences. For example, in FIG. 9, an F1 interface between an access IAB node and a donor-CU uses an F1 control plane (F1-C) protocol stack, and the F1-C protocol stack includes an F1 application protocol (FLAP) layer and a stream control transmission protocol (SCTP) layer.

It should be noted that, FIG. 8 and FIG. 9 respectively show an example of an end-to-end user plane protocol stack architecture and an example of an end-to-end control plane protocol stack architecture for transmitting a data service of UE in the IAB network. Optionally, there may be another possibility for the protocol stack architecture. For example, when a protocol stack used for security protection is introduced to the F1 interface between the IAB node 2 and the donor-CU, the protocol stack architecture changes.

The current technology does not involve a related solution in which the IAB architecture supports a multicast mechanism. In view of this, the embodiments may provide a multicast method, to implement that the IAB architecture supports the multicast mechanism. The following describes the method.

Figure 10:
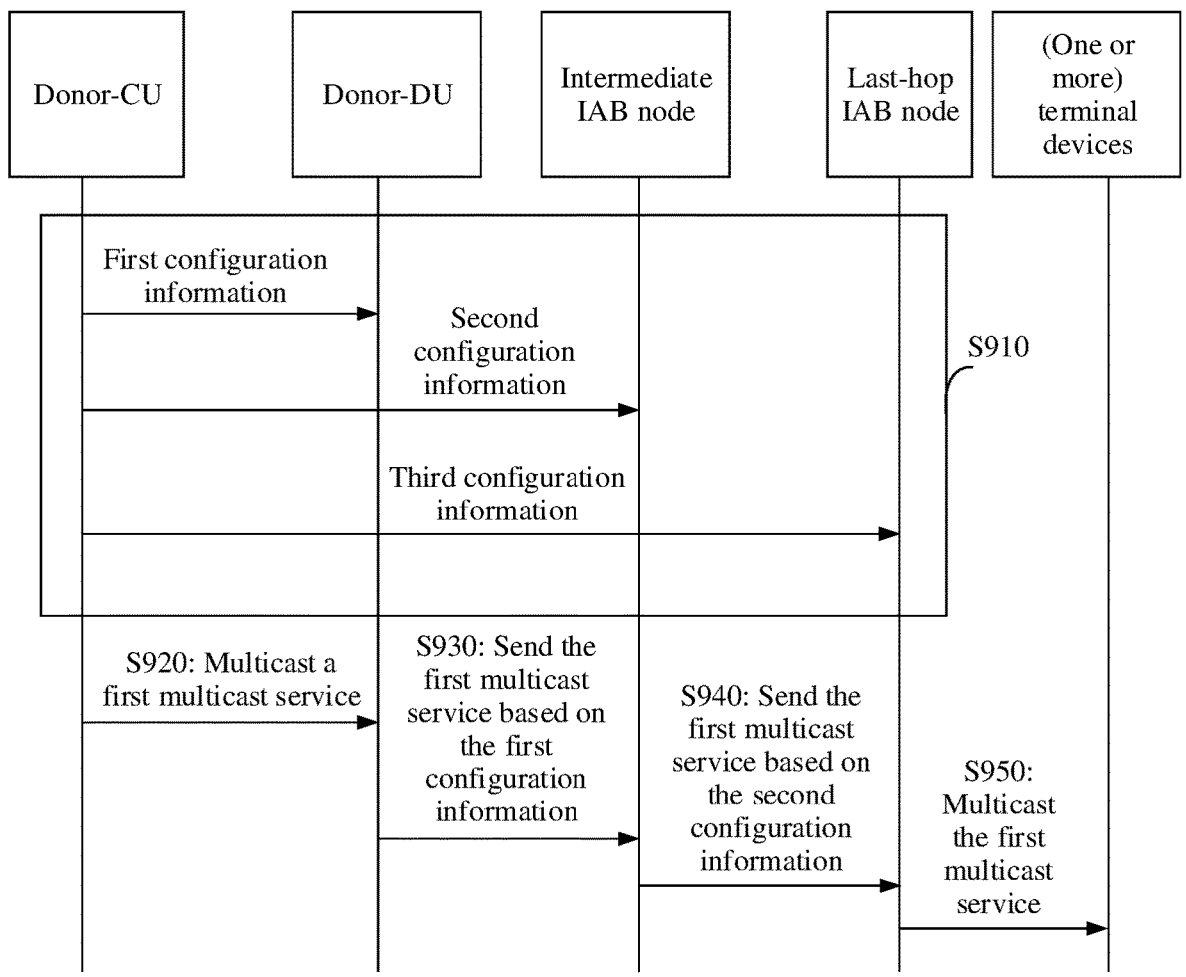
FIG. 10 is a schematic flowchart of a method for multicast communication.

FIG. 10 is a schematic flowchart of a method for multicast communication. The following describes steps in the method 900.

S910: A CU (namely, a donor-CU or a first network device) of a donor node sends first configuration information to a DU (namely, a donor-DU or a second network device) of the donor node, sends second configuration information to each intermediate IAB node that is on a path from the donor-CU to a first terminal device, and sends third configuration information to a last-hop IAB node.

The intermediate IAB node may also be referred to as a first IAB node and the last-hop IAB node may also be referred to as a second IAB node. The first terminal device accesses the last-hop IAB node.

The first configuration information, each piece of the second configuration information, and the third configuration information each are related to at least one multicast service. In the following, one multicast service (namely, a first multicast service) in the at least one multicast service is used as an example to describe the first configuration information, the second configuration information, and the third configuration information. It should be understood that, the first multicast service is a multicast service that the last-hop IAB node needs to multicast through an air interface.

The first configuration information is used by the donor-DU to perform the following operations: (1) determining whether a received multicast service is the first multicast service; and (2) when receiving the first multicast service, determining whether the multicast service needs to be multicast (multicast through the air interface), and determining to forward the multicast service to which IAB node (in other words, which IAB node is the next-hop IAB node) and forward the multicast service to the next-hop IAB node through which logical channel.

The second configuration information is used by the intermediate IAB node to perform, when receiving the first multicast service, the following operations: (1) determining whether the first multicast service needs to be multicast through the air interface; (2) when the first multicast service needs to be multicast through the air interface, determining a multicast traffic channel corresponding to the first multicast service; (3) determining whether the first multicast service needs to be forwarded; and (4) when the first multicast service needs to be forwarded, determining to forward the first multicast service to which IAB node and forward the first multicast service to the next-hop IAB node through which logical channel.

The third configuration information is used by the last-hop IAB node to determine, when receiving the first multicast service, a multicast traffic channel corresponding to the first multicast service.

For example, the first configuration information may include a combination of any one or more of the following: multicast service information, TNL address information, routing information, a BAP address of the next-hop IAB node, a link configuration (for example, a backhaul link configuration or a backhaul radio link control channel (BH RLC CH) configuration BH RLC CH configuration), and an indication indicating whether multicast (air interface multicast) is required.

The multicast service information indicates the first multicast service. For a possible form of the multicast service information, refer to the descriptions in S310. In the following, that first multicast service information is a TMGI is used as an example.

The TNL address information corresponds to the multicast service and includes an IP address and a TEID. The IP address may be referred to as a multicast IP address, and the TEID may be referred to as a multicast TEID. There is a one-to-one correspondence between the TNL address information and the multicast service information. For example, a TMGI #1 corresponds to TNL address information #1, the TMGI #1 corresponds to an IP address #1 and a TEID #1. A TMGI #2 corresponds to TNL address information #2, the TMGI #2 corresponds to an IP address #2 and a TEID #2.

The routing information may be represented as a routing ID. The routing information may include the BAP address of the last-hop IAB node and a path identifier (path ID). The path identifier indicates different transmission paths. For example, different path identifiers may correspond to different next-hop nodes.

After receiving the first multicast service, the donor-DU may encapsulate the routing information into a BAP layer corresponding to the first multicast service.

The multicast service information corresponds to at least one piece of routing information. For example, the TMGI #1 corresponds to the TNL address information #1, and also corresponds to routing information #1. The TMGI #2 corresponds to the TNL address information #2, and also corresponds to routing information #2 and routing information #3.

The BAP address of the next-hop IAB node is a BAP address of the next-hop IAB node corresponding to the first multicast service when the donor-DU needs to forward the first multicast service.

Link configuration: When determining that the first multicast service needs to be forwarded, the donor-DU forwards the first multicast service based on the link configuration. The link configuration may be a combination of one or more of the following: an identity of a logical channel corresponding to the first multicast service, an identifier of a DRB corresponding to the first multicast service, and an identifier of an RLC backhaul channel corresponding to the first multicast service. The link configuration corresponds to the BAP address of the next-hop IAB node. The link configuration and the BAP address of the next-hop IAB node are considered as a configuration combination. The routing information corresponds to at least one configuration combination. For example, a multicast service #1 corresponds to the routing information #1, and the routing information #1 corresponds to (BAP address #1, link configuration #1) and (BAP address #2, link configuration #2). A multicast service #2 corresponds to the routing information #2 and the routing information #3. The routing information #2 corresponds to (BAP address #3, link configuration #3). The routing information #3 corresponds to (BAP address #4, link configuration #4) and (BAP address #5, link configuration #5).

Indication indicating whether multicast is required: The DU may determine, based on the indication, whether the first multicast service needs to be multicast through the air interface. The indication may be a multicast indication. When the indication includes the multicast indication, it indicates that the DU needs to perform multicast through the air interface. The indication may be a I/O indication or a true/false indication. When the indication is 1 or true, it indicates that the DU needs to perform multicast through the air interface. When the indication is 0 or false, it indicates that the DU does not need to perform multicast through the air interface.

After receiving the multicast service from the CU, the donor-DU determines a multicast service based on TNL address information included in an IP header/a UDP header/a GTP-U header encapsulated outside the multicast service and the correspondence between the TNL address information and the multicast service information, determines, based on a correspondence between the multicast service information (or the multicast service) and the routing information, which routing information should be filled in at the BAP layer encapsulating the multicast service, and then determines, based on the next-hop IAB node and the link configuration, to forward the multicast service to which next-hop IAB node and through which backhaul. In addition, the donor-DU determines, based on the indication indicating whether multicast is required, whether to multicast the multicast service through the air interface. When the multicast service needs to be multicast through the air interface, it means that the donor-DU needs to replicate the multicast service to obtain a plurality of multicast services. For example, one multicast service is sent to the next-hop IAB node, and another multicast service is directly multicast through the air interface. Further, the plurality of multicast services may alternatively be sent to a plurality of next-hop IAB nodes.

The TNL address information corresponds to the multicast service and includes an IP address and a TEID. The IP address may be referred to as a multicast IP address, and the TEID may be referred to as a multicast TEID. There is a one-to-one correspondence between the TNL address information and the multicast service information. For example, a TMGI #1 corresponds to TNL address information #1, an IP address #1 and a TEID #1. A TMGI #2 corresponds to TNL address information #2, an IP address #2 and a TEID #2.

The second configuration information may include a combination of any one or more of the following: multicast service information, routing information, a BAP address of the next-hop IAB node, a link configuration, and an indication indicating whether multicast (air interface multicast) is required.

The multicast service information is the same as the multicast service information in the first configuration information.

The routing information is the same as the routing information in the first configuration information. When receiving the first multicast service, the intermediate IAB node determines whether the first multicast service needs to be forwarded, in other words, whether the first multicast service needs to be sent to the next-hop IAB node. For example, the IAB node determines whether a BAP address in routing information included in a BAP layer encapsulated outside a received data packet is the same as a BAP address of the IAB node. If the BAP addresses are the same, it indicates that the IAB node is the last-hop IAB node; otherwise, the IAB node needs to forward the first multicast service.

The BAP address of the next-hop IAB node is a BAP address of the next-hop IAB node corresponding to the first multicast service when the intermediate IAB node determines that the first multicast service needs to be forwarded.

Link configuration: When determining that the first multicast service needs to be forwarded, the intermediate IAB node forwards the first multicast service based on the link configuration. The link configuration includes: (1) a combination of one or more of the following: an identity of a logical channel for receiving the first multicast service, an identifier of a DRB for receiving the first multicast service, and an identifier of an RLC backhaul channel for receiving the first multicast service; and (2) a combination of one or more of the following: an identity of a logical channel for forwarding the first multicast service to the next-hop IAB node, an identifier of a DRB for forwarding the first multicast service to the next-hop IAB node, and an identifier of an RLC backhaul channel for forwarding the first multicast service to the next-hop IAB node. There is a correspondence between the first multicast service and the identity of the logical channel for receiving the first multicast service. For example, a logical channel identity #1 corresponds to a multicast service #1, and a logical channel identity #2 corresponds to a multicast service #2. In this case, the intermediate IAB node may determine corresponding multicast service information based on the identity of the logical channel.

Indication indicating whether multicast is required: The intermediate IAB node may determine, based on the indication, whether the first multicast service needs to be multicast through the air interface.

After receiving the first multicast service from a previous-hop node, an MT of an IAB node determines, based on a correspondence between the routing information and the identity of the logical channel for receiving the first multicast service, whether the first multicast service needs to be forwarded. In particular, the MT of the IAB node needs to forward, to a DU of the IAB node through an internal interface, the first multicast service received from the previous-hop node, so that the DU of the IAB node can determine, based on the next-hop IAB node and the link configuration, to forward the first multicast service to which next-hop IAB node and through which backhaul. In addition, the MT of the IAB node further forwards the first multicast service to the DU of the IAB node based on the indication indicating whether multicast is required. The DU of the IAB node determines, based on the indication, whether to multicast the first multicast service through the air interface. When the first multicast service needs to be multicast through the air interface, the IAB node may determine, based on the multicast service information corresponding to the first multicast service, a corresponding multicast traffic channel for multicasting the first multicast service through the air interface. When the first multicast service needs to be multicast through the air interface, it means that the IAB node needs to replicate the first multicast service to obtain a plurality of first multicast services. For example, one first multicast service is sent to the next-hop IAB node, and another first multicast service is directly multicast through the air interface. Additionally, the plurality of first multicast services may alternatively be sent to a plurality of next-hop IAB nodes.

The third configuration information may include a combination of any one or more of the following: multicast service information and a multicast IP address. The multicast service information is the same as the multicast service information in the first configuration information. The multicast service information corresponds to the multicast IP address. An IAB node may learn of corresponding multicast service information based on an IP address included in a data packet, to multicast the first multicast service through the air interface based on a multicast data channel corresponding to the multicast service information.

Optionally, the donor-CU may send the second configuration information and the third configuration information by using an RRC message, or may send the second configuration information and the third configuration information by using an F1 interface message. In other words, the CU may send a first RRC message to the intermediate node, where the first RRC message may include the second configuration information. Alternatively, the CU may send the second configuration information to the intermediate node through an F1 interface between the CU and the intermediate node. Similarly, the CU may send a second RRC message to the last-hop IAB node, where the second RRC message may include the third configuration information. Alternatively, the CU may send the third configuration information to the last-hop IAB node through an F1 interface between the CU and the last-hop IAB node. Alternatively, some content of the second configuration information and the third configuration information may be sent by using an RRC message, and some content may be sent by using an F1 interface message.

It should be noted that, in the method, the intermediate IAB node may also be referred to as a first IAB node, and the last-hop IAB node may also be referred to as a second IAB node.

After the configuration process in S910 is completed, the following describes a user plane data sending process.

S920: The donor-CU sends the first multicast service to the donor-DU.

After receiving a first multicast service sent by a core network or a multicast server, the donor-CU sends the first multicast service to the DU through a user plane tunnel set up between the CU and the DU for the first multicast service. After receiving the first multicast service, the DU determines, based on the first configuration information, whether the first multicast service needs to be multicast through the air interface, and determines a next-hop IAB node and a logical channel that is between the donor-DU and the next-hop IAB node and that is used to transmit the first multicast service.

For example, the DU receives a multicast service and an IP header, a UDP header, and a GTP-U header that are encapsulated outside the multicast service, where the GTP-U header includes a TEID, and forms a TNL address in combination with an IP address included in the IP header and a TEID included in the GTP-U header. If the TNL address information is the TNL address information corresponding to the multicast service information in the first configuration information, the DU may first determine that the multicast service is the first multicast service. Then, the DU may perform, based on the first configuration information, the following operations: (1) if the indication indicating whether multicast is required indicates that multicast is required, multicasting the first multicast service on the multicast traffic channel corresponding to the first multicast service; otherwise, skipping multicasting the first multicast service; (2) adding the routing information corresponding to the multicast service information in the first configuration information to the BAP header corresponding to the first multicast service; and (3) determining a C-RNTI of an MT of the next-hop IAB node on the air interface based on the BAP address of the next-hop IAB node corresponding to the first multicast service, and learning of, based on the link configuration, a logical channel through which the first multicast service is sent to the MT of the next-hop IAB node.

S930: The donor-DU sends the first multicast service to the next-hop IAB node. For ease of understanding, the next-hop IAB node herein is denoted as an IAB node 1.

After receiving the first multicast service, the IAB node 1 determines, based on the second configuration information, whether the first multicast service needs to be multicast through the air interface and whether the first multicast service needs to be sent to the next-hop IAB node, and determines, when the first multicast service needs to be forwarded, information about the next-hop IAB node and information logical channel information) that is about the IAB node 1 and the next-hop IAB node and that is used to transmit the first multicast service.

For example, after the IAB node 1 (the MT of the IAB node 1) receives the first multicast service, because the BAP address included in the routing information in the BAP header (a BAP header used to encapsulate the first multicast service) corresponding to the first multicast service is different from a BAP address of the IAB node 1, it is not considered that the IAB node 1 is the last-hop IAB node. The IAB node 1 determines, based on the indication indicating whether multicast is required in the second configuration information, whether the first multicast service needs to be multicast through the air interface. If multicast is required, the IAB node 1 multicasts the first multicast service on the multicast traffic channel corresponding to the first multicast service; otherwise, the IAB node 1 does not multicast the first multicast service. In addition, the IAB node 1 determines the C-RNTI of the MT of the next-hop IAB node on the air interface based on the BAP address of the corresponding next-hop IAB node, and learns of, based on the link configuration, a logical channel through which the first multicast service is sent to the MT of the next-hop IAB node.

S940: The IAB node 1 sends the first multicast service to the next-hop IAB node. For ease of understanding, the next-hop IAB node herein is denoted as an IAB node 2.

If the IAB node 2 is an intermediate IAB node, in other words, the configuration information sent by the donor-CU to the IAB node 2 is the second configuration information, the IAB node 2 determines, based on the second configuration information, whether the first multicast service needs to be multicast through the air interface and whether the first multicast service needs to be sent to the next-hop IAB node, and determines, when the first multicast service needs to be forwarded, information about the next-hop IAB node and information (logical channel information) that is about the IAB node 2 and the next-hop IAB node and that is used to transmit the first multicast service. If the IAB node 2 is a last-hop IAB node, in other words, the configuration information sent by the donor-CU to the IAB node 2 is the third configuration information, the IAB node 2 determines, based on the third configuration information and the IP address, a corresponding multicast traffic channel of the first multicast service, and multicasts the first multicast service on the multicast traffic channel corresponding to the first multicast service.

For example, if the configuration information sent by the donor-CU to the IAB node 2 is the second configuration information, because the BAP address included in the routing information in the BAP header corresponding to the first multicast service is different from a BAP address of the IAB node 2, the IAB node 2 considers that the IAB node 2 is not the last-hop IAB node. The IAB node 2 determines, based on the indication indicating whether multicast is required in the second configuration information, whether the first multicast service needs to be multicast through the air interface. If multicast is required, the IAB node 2 multicasts the first multicast service on the multicast traffic channel corresponding to the first multicast service; otherwise, the IAB node 2 does not multicast the first multicast service. In addition, the IAB node 2 determines the C-RNTI of the MT of the next-hop IAB node on the air interface based on the BAP address of the corresponding next-hop IAB node, and learns of, based on the link configuration, a logical channel through which the first multicast service is sent to the MT of the next-hop IAB node. If the configuration information sent by the donor-CU to the IAB node 2 is the third configuration information, the IAB node 2 determines, based on the third configuration information and the IP address, a corresponding multicast traffic channel of the first multicast service, and multicasts the multicast traffic channel on the multicast traffic channel corresponding to the first multicast service.

S950: The IAB node 2 multicasts the first multicast service on the multicast traffic channel corresponding to the first multicast service.

That the IAB node 2 is the last-hop IAB node is used as an example. After receiving the first multicast service, the IAB node 2 determines a corresponding multicast traffic channel of the first multicast service based on the IP address, and multicasts the first multicast service on the multicast traffic channel corresponding to the first multicast service.

In conclusion, according to the method for multicast communication, the donor-CU configures, for the donor-DU, the intermediate IAB node, and the last-hop IAB node, corresponding configuration information used for multicast, so that the donor-DU, the intermediate IAB node, and the last-hop IAB node can multicast a multicast service based on the corresponding configuration information.

Figure 11:
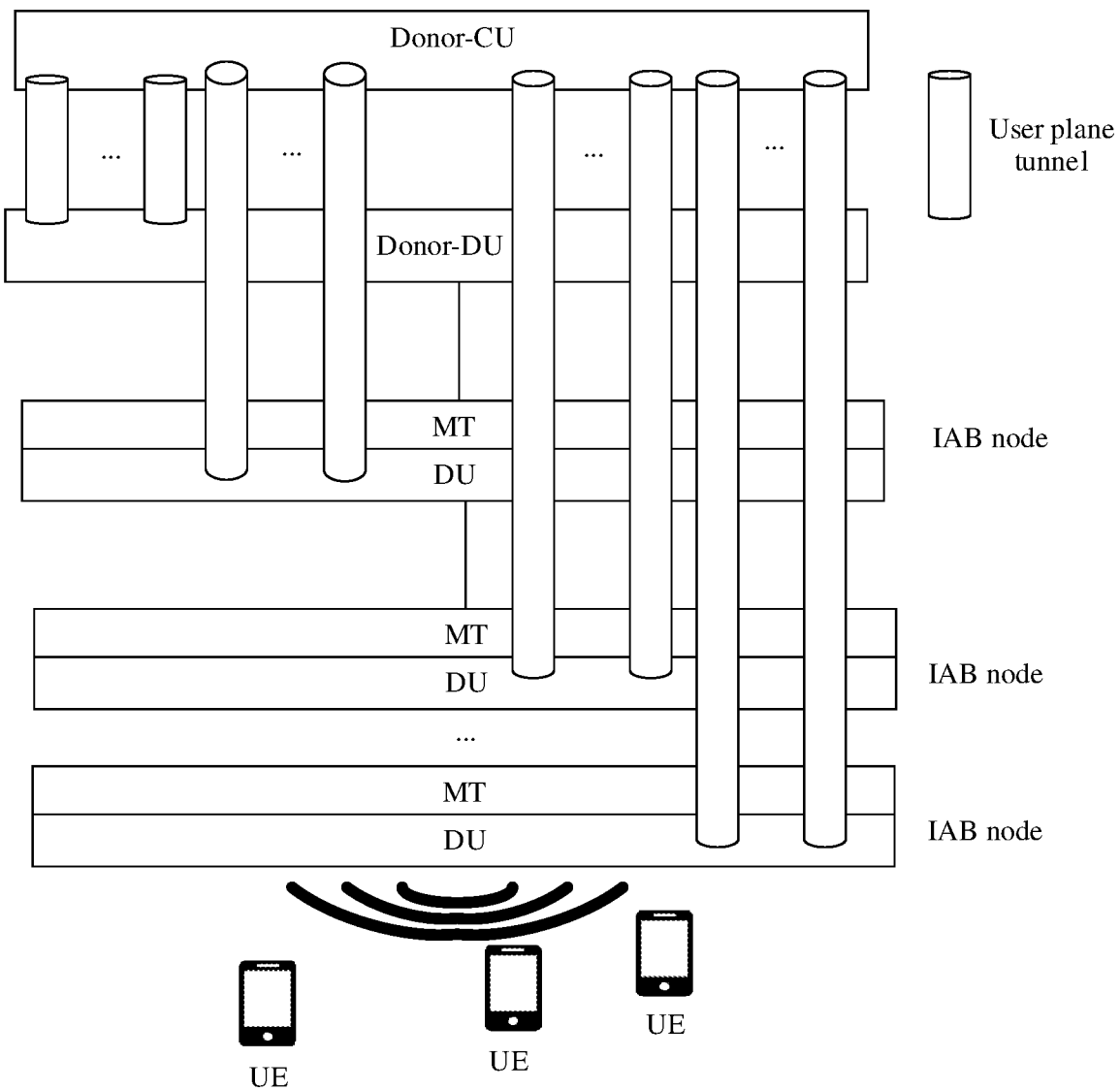
FIG. 11 is a schematic diagram of another method for multicast communication.

FIG. 11 is a schematic diagram of another method for multicast communication. The following describes the method.

1. Set Up a User Plane Tunnel:

A donor-CU (namely, a first network device) sets up at least one user plane tunnel to a donor-DU (namely, a second network device), and sets up at least one user plane tunnel to a DU of each IAB node.

Figure 12:
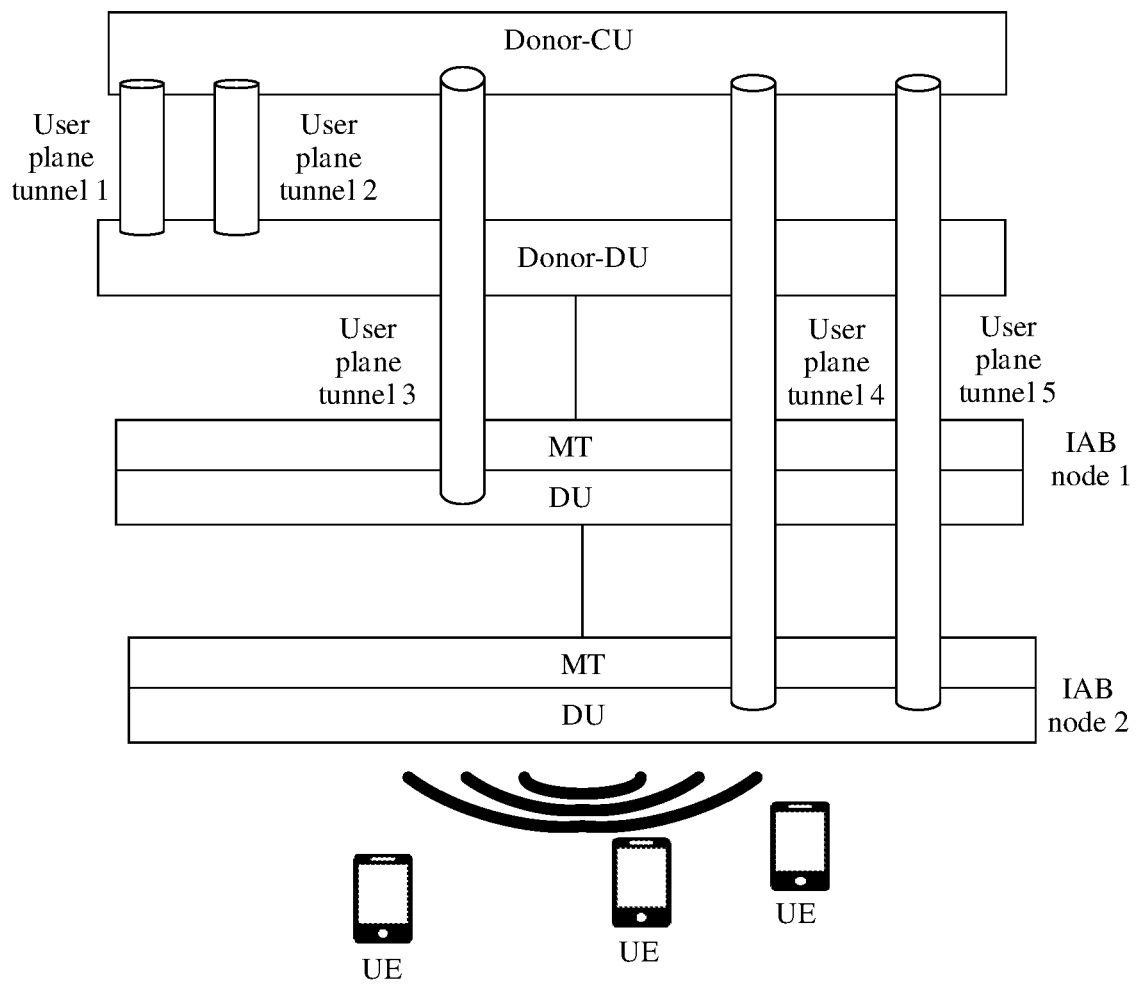
FIG. 12 is an example of the method for multicast communication shown in FIG. 11.

Each IAB node is an IAB node on a path from the donor-CU to a first terminal device. For example, an architecture shown in FIG. 12 is used as an example, and IAB nodes herein refer to an IAB node 1 and an IAB node 2.

For ease of understanding, the user plane tunnel between the donor-CU and the donor-DU is denoted as a first user plane tunnel. The user plane tunnel between the donor-CU and the IAB node is denoted as a second user plane tunnel. Each IAB node may correspond to at least one second user plane tunnel.

It should be understood that, both the first user plane tunnel and the second user plane tunnel are wireless F1 interface user plane tunnels. For details about how to set up the user plane tunnel between the CU and the DU, refer to the conventional technology. Details are not described herein again.

Each user plane tunnel corresponds to one multicast service. The donor-CU may send at least one multicast service to the donor-DU through at least one first user plane tunnel. For any IAB node, the donor-CU may send at least one multicast service to a DU of the IAB node through at least one second user plane tunnel corresponding to the IAB node. The donor-CU may determine, according to an operator policy, to send which multicast services to the IAB node, or may finally determine, based on an interested multicast service reported by a terminal device to the CU and with reference to an IAB node accessed by the terminal device, to send which multicast services to each IAB node.

The networking architecture shown in FIG. 12 is used as an example. If a terminal device accessing the donor-DU is interested in only two multicast services, user plane tunnels for transmitting the two multicast services may be set up between the donor-CU and the donor-DU, where the user plane tunnels are denoted as a user plane tunnel 1 and a user plane tunnel 2. If a terminal device accessing a DU of the IAB node 1 is interested in only one multicast service, a user plane tunnel for transmitting the multicast service may be set up between the donor-CU and the DU of the IAB node 1, where the user plane tunnel is denoted as a user plane tunnel 3. If a terminal device accessing a DU of the IAB node 2 is interested in only two multicast services, user plane tunnels for transmitting the two multicast services may be set up between the donor-CU and the DU of the IAB node 2, where the user plane tunnels are denoted as a user plane tunnel 4 and a user plane tunnel 5. The five multicast services corresponding to the user plane tunnels 1 to 5 may be all the same, partially the same, or all different.

2. Transmit Multicast Data Through the User Plane Tunnel:

The donor-CU sends the at least one first multicast service to the donor-DU through the at least one first user plane tunnel, where the at least one first user plane tunnel is in one-to-one correspondence with the at least one first multicast service. The donor-DU multicasts the at least one first multicast service to the terminal device accessing the donor-DU.

The donor-CU sends at least one second multicast service to a DU of a corresponding IAB node through at least one second user plane tunnel corresponding to each IAB node, where the at least one second user plane tunnel is in one-to-one correspondence with the at least one second multicast service. Each IAB node multicasts, through an air interface, the at least one second multicast service to a terminal device accessing the IAB node.

As shown in FIG. 12, the donor-CU may respectively transmit a multicast service 1 and a multicast service 2 through the user plane tunnel 1 and the user plane tunnel 2. After receiving the multicast service 1 and the multicast service 2, the donor-DU multicasts the multicast service 1 and the multicast service 2 through corresponding multicast traffic channels. The donor-CU transmits, through the user plane tunnel 3, a multicast service 3 corresponding to the IAB node 1. After receiving the multicast service 3, the DU of the IAB node 1 multicasts the multicast service 3. The donor-CU respectively transmits a multicast service 4 and a multicast service 5 that correspond to the IAB node 2 through the user plane tunnels 4 and 5. After receiving the multicast service 4 and the multicast service 5, the DU of the IAB node 2 multicasts the multicast service 4 through a multicast traffic channel corresponding to the multicast service 4, and multicasts the multicast service 5 through a multicast traffic channel corresponding to the multicast service 5.

In conclusion, according to the multicast method, a user plane tunnel between the donor-CU and the donor-DU is set up for a multicast service that the terminal device accessing the donor-DU is interested in, and a user plane tunnel between the donor-CU and the DU of the IAB node is set up for a multicast service that the terminal device accessing the DU of each IAB node is interested in, to implement a multicast mechanism in an IAB architecture.

Figure 13A:
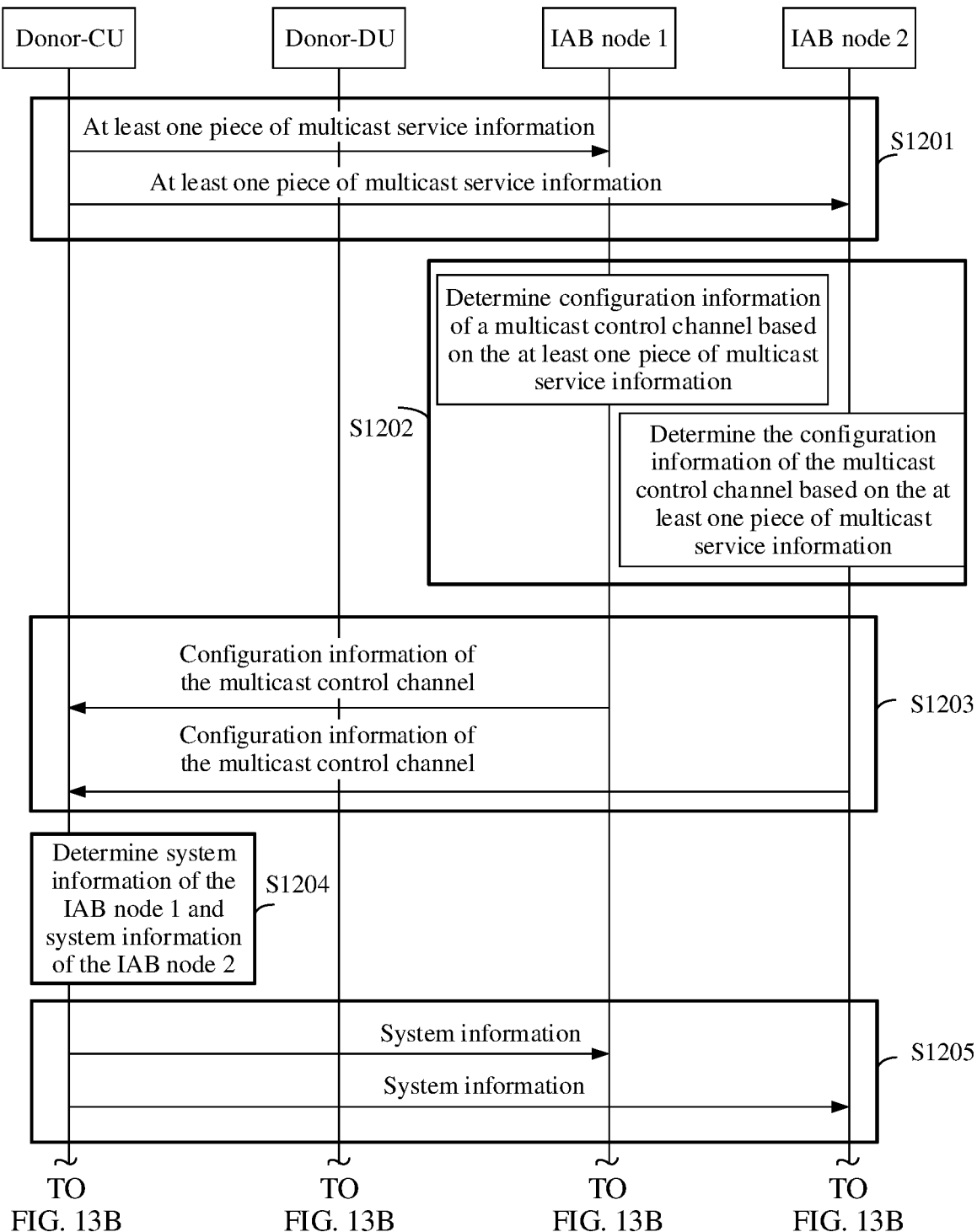
FIG. 13A and FIG. 13B are a schematic flowchart of a method for multicast communication.
Figure 13B:
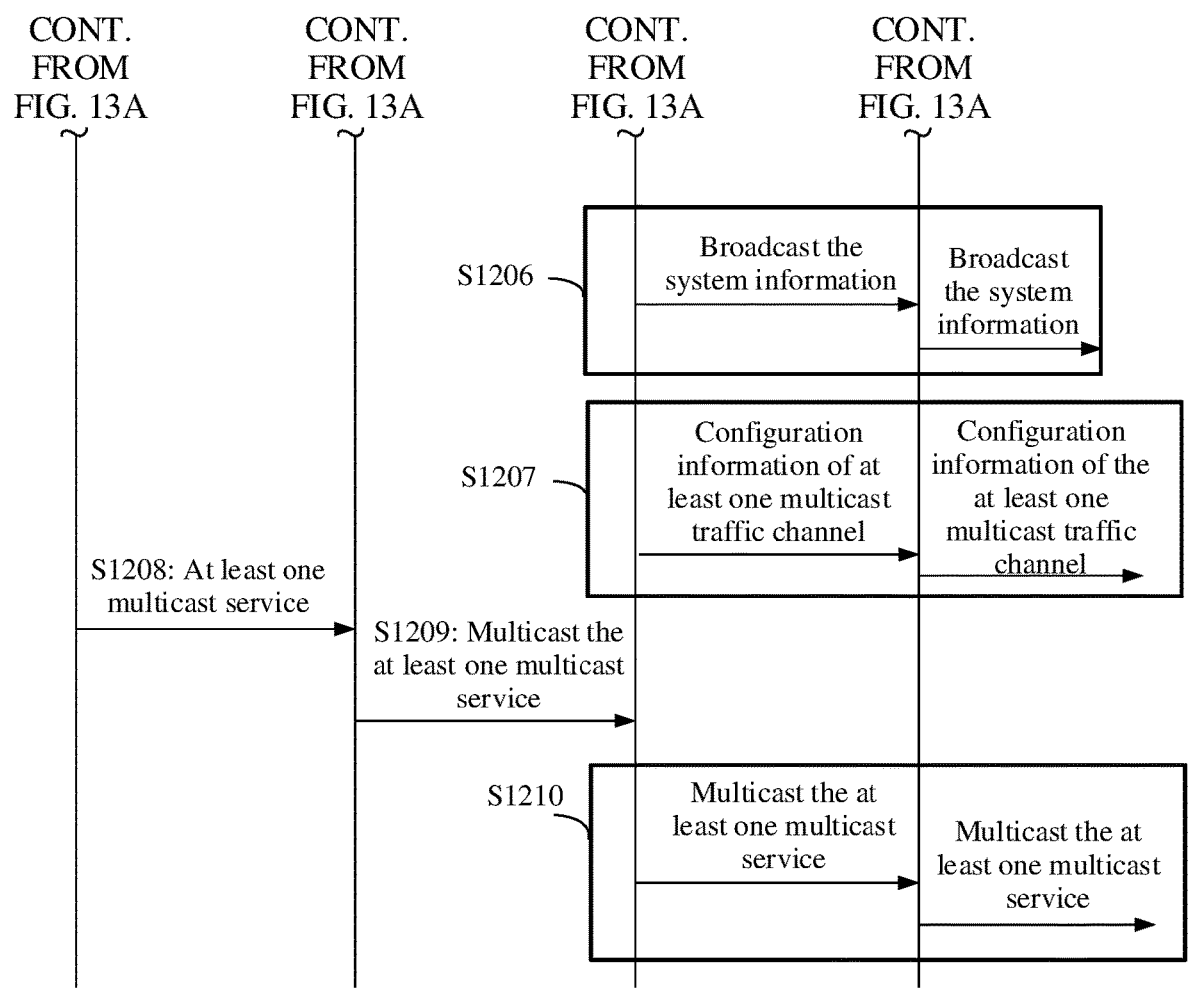

FIG. 13A and FIG. 13B are a schematic diagram of another method for multicast communication. The following describes the method 1200.

S1201: A donor-CU (namely, a first network device) separately sends at least one piece of multicast service information to each IAB node that is on a path from the donor-CU to a first terminal device.

The donor-CU may send the at least one piece of multicast service information to an MT of each IAB node or a DU of each IAB node. For example, the donor-CU may send the at least one piece of multicast service information by using an RRC message between the donor-CU and the MT of the IAB node or an F1 interface message between the donor-CU and the DU of the IAB node. The at least one piece of multicast service information is information about at least one multicast service that the corresponding IAB node needs to monitor and multicast. For a form of the multicast service information, refer to the descriptions in S310. If an IAB node is not a last-hop IAB node, at least one multicast service that the IAB node needs to monitor and multicast is a set of a multicast service that a next-hop IAB node needs to monitor and multicast and a multicast service that a terminal device accessing the IAB node through an access link needs to monitor. If an IAB node is a last-hop IAB node, at least one multicast service that the IAB node needs to monitor and multicast is a multicast service that a terminal device accessing the IAB node through an access link needs to monitor.

Figure 14:
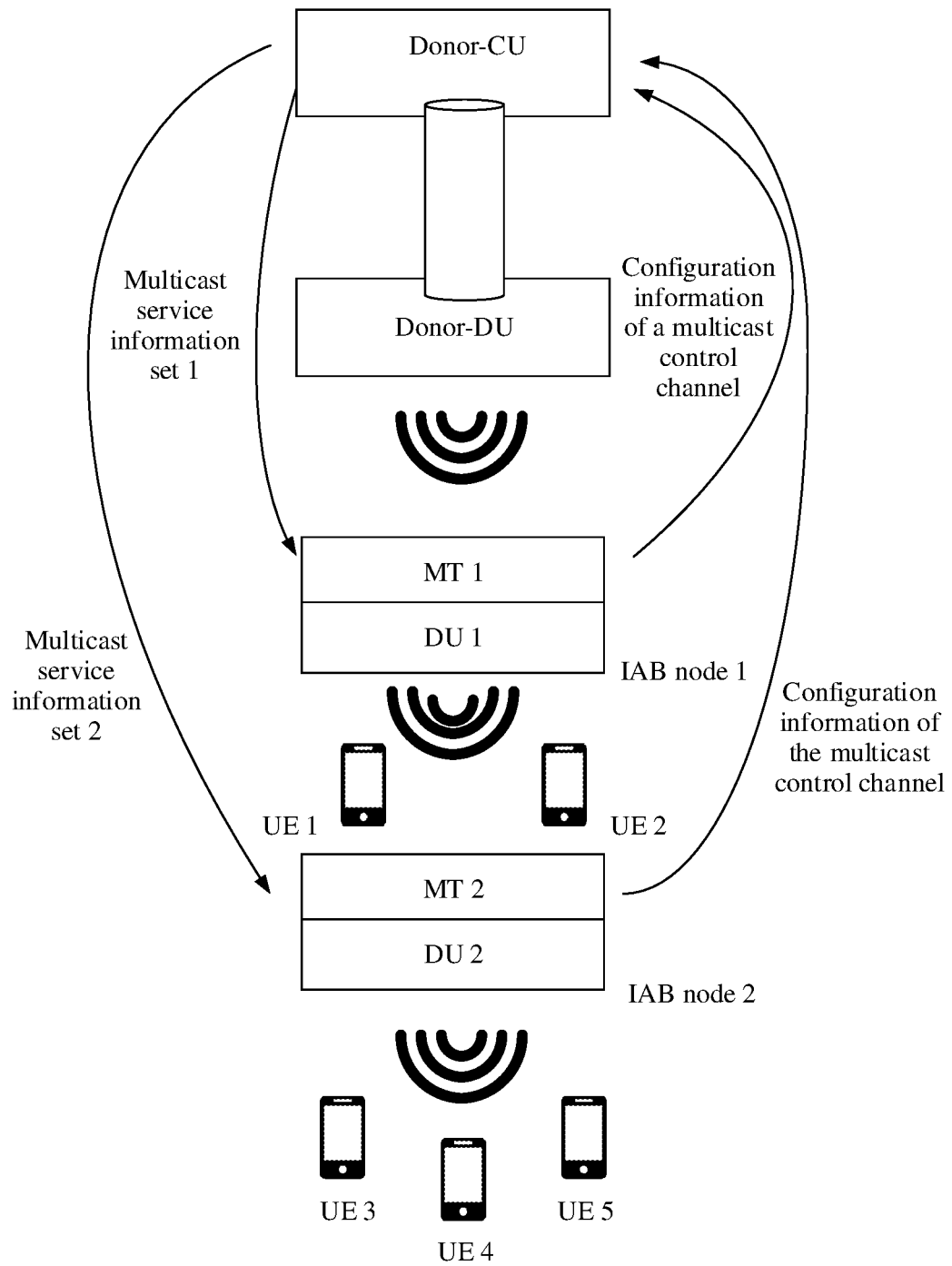
FIG. 14 is an example of the method for multicast communication shown in FIG. 13A and FIG. 13B.

A networking architecture shown in FIG. 14 is used as an example for description. The first terminal device may be any UE of UE 3, UE 4, and UE 5, and IAB nodes on the path from the donor-CU to the first terminal device include an IAB node 1 and an IAB node 2. The donor-CU separately sends the at least one piece of multicast service information to an MT (namely, an MT 1) of the IAB node 1 and an MT (namely, an MT 2) of the IAB node 2. For ease of understanding, the at least one piece of multicast service information sent by the donor-CU to the MT 1 is denoted as a multicast service information set 1, and the at least one piece of multicast service information sent by the donor-CU to the MT 2 is denoted as a multicast service information set 2. In FIG. 14, terminal devices accessing a DU (namely, a DU 1) of the IAB node 1 are UE 1 and UE 2, and terminal devices accessing a DU (namely, a DU 2) of the IAB node 2 are the UE 3, the UE 4, and the UE 5. A multicast service indicated by the multicast service information set 2 is a set of multicast services that the IAB node 2 needs to monitor and multicast, a set of multicast services that the UE 3, the UE 4, and the UE 5 need to monitor. A multicast service indicated by the multicast service information set 1 is a set of multicast services that the IAB node 1 needs to monitor and multicast, a set of multicast services that the UE 1 and the UE 2 need to monitor and a multicast service that the IAB node 2 needs to monitor and multicast. For example, if the multicast services that the UE 3, the UE 4, and the UE 5 need to monitor are a multicast service 4 to a multicast service 8, and the multicast services that the UE 1 and the UE 2 need to monitor are a multicast service 1 to a multicast service 5, the IAB node 1 needs to monitor and multicast the multicast service 1 to the multicast service 8, and the IAB node 2 needs to monitor and multicast the multicast service 4 to the multicast service 8.

S1202: Each IAB node determines configuration information of a multicast control channel based on the at least one piece of corresponding multicast service information.

After receiving the at least one piece of multicast service information sent by the donor-CU, an MT of any IAB node sends the at least one piece of multicast service information to a DU of the IAB node, and the DU of the IAB node generates configuration information of a multicast control channel based on the at least one piece of multicast service information. Alternatively, after receiving the at least one piece of multicast service information sent by the donor-CU, the DU of the IAB node generates the configuration information of the multicast control channel.

For details about how to generate the configuration information of the multicast control channel based on the multicast service information, refer to the foregoing step S520.

S1203: Each IAB node sends the determined configuration information of the multicast control channel to the donor-CU.

For example, refer to FIG. 13A and FIG. 13B. After separately determining the configuration information of the multicast control channel, the DU 1 and the DU 2 send the configuration information of the multicast control channel to the donor-CU. For example, the DU of the IAB node sends the configuration information of the multicast control channel to the donor-CU through an F1 interface. Alternatively, the DU of the IAB node sends the configuration information of the multicast control channel to the MT of the IAB node through an internal interface, and the MT of the IAB node sends the configuration information of the multicast control channel to the donor-CU by using an uplink RRC message.

S1204: The donor-CU determines system information of each IAB node based on the configuration information that is of the multicast control channel and that is reported by each IAB node.

The system information of any IAB node includes the configuration information of the multicast control channel corresponding to the IAB node.

S1205: The donor-CU sends the corresponding system information to each IAB node.

For example, the donor-CU may send the system message to the DU of the corresponding IAB node through the F1 interface.

S1206: Each IAB node broadcasts the received system information.

For example, the IAB node 1 broadcasts the received system information, and the UE 1, the UE 2, and the IAB node 2 may receive the system information. The IAB node 2 broadcasts the received system information, and the UE 3, the UE 4, and the UE 5 may receive the system information.

S1207: Each IAB node sends configuration information of at least one multicast traffic channel on the multicast control channel based on the configuration information of the multicast control channel in the received system information.

It should be understood that, the at least one multicast traffic channel configured by the configuration information that is of the at least one multicast traffic channel and that is sent by each IAB node is used to transmit the at least one multicast service corresponding to the IAB node.

It should be noted that, before S1208, a donor-DU (namely, a second network device) interacts with the donor-CU with reference to the method 500 described above, to obtain corresponding system information, and may send configuration information of at least one multicast traffic channel on a multicast control channel based on configuration information of the multicast control channel in the system information, where the at least one multicast traffic channel is used to send at least one multicast service that the donor-DU needs to multicast. The at least one multicast service that the DU needs to multicast includes at least one multicast service that the IAB node 1 needs to monitor and multicast. For example, if the IAB node 1 needs to monitor and multicast the multicast service 1 to the multicast service 8, the DU needs to multicast the multicast service 1 to the multicast service 8.

By S1207, the control plane message procedure related to the multicast channel ends. The following is a user plane procedure.

S1208: The donor-CU sends the at least one multicast service to the donor-DU. The at least one multicast service is at least one multicast service that the donor-DU needs to multicast.

For example, the donor-CU sends the multicast service 1 to the multicast service 8 to the donor-DU.

S1209: The donor-DU multicasts, based on the configuration information of the at least one multicast traffic channel corresponding to the donor-DU, the at least one multicast service received by the donor-DU.

For example, the donor-DU multicasts the multicast service 1 to the multicast service 8. Correspondingly, the MT 1 of the IAB node 1 may receive the multicast service 1 to the multicast service 8.

S1210: Each IAB node sends, based on configuration information of at least one multicast traffic channel corresponding to the IAB node, at least one multicast service corresponding to the IAB node.

For example, after receiving the multicast service 1 to the multicast service 8 that are multicast by the donor-DU, the MT 1 of the IAB node 1 sends the multicast services to the DU 1 of the IAB node 1, and the DU 1 multicasts the multicast service 1 to the multicast service 8. The UE 1 and the UE 2 monitor the multicast service 1 to the multicast service 5, and the MT 2 of the IAB node 2 monitors the multicast service 4 to the multicast service 8. The IAB node 2 sends the received multicast service 4 to the received multicast service 8 to the DU 2 of the IAB node 2, and the DU 2 of the IAB node 2 multicasts the multicast service 4 to the multicast service 8. Correspondingly, the UE 3, the UE 4, and the UE 5 monitor the multicast service 4 to the multicast service 8.

In conclusion, according to the method for multicast communication, the donor-CU configures a multicast service that the donor-DU needs to multicast and a multicast service that each IAB node needs to monitor and multicast, so that the donor-DU can multicast the multicast service based on the configuration of the donor-CU. Each IAB node may monitor and multicast the multicast service based on the configuration of the donor-CU, to implement multicast communication in an IAB architecture.

The foregoing describes in detail the method provided in the embodiments with reference to FIG. 3 to FIG. 14. The following describes in detail apparatuses provided in the embodiments with reference to FIG. 15 to FIG. 17.

Figure 15:
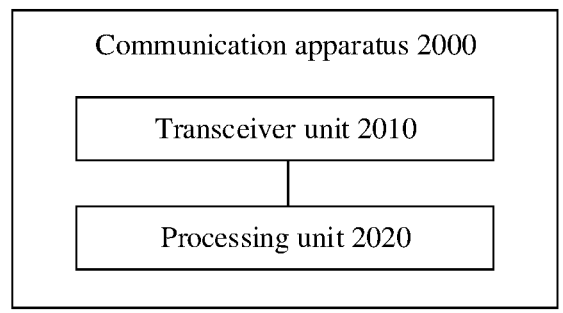
FIG. 15 is a schematic block diagram of a communication apparatus.

FIG. 15 is a schematic block diagram of a communication apparatus according to an embodiment. As shown in FIG. 15, the communication apparatus 2000 may include a transceiver unit 2010 and/or a processing unit 2020.

The transceiver unit 2010 may be configured to send information to another apparatus or device, or receive information from another apparatus or device. The processing unit 2020 may be configured to perform partial processing of the apparatus.

In an implementation, the communication apparatus 2000 corresponds to the first network device (namely, the CU) in the foregoing method 300. The communication apparatus 2000 may be the first network device or a chip configured in the first network device, and may include a unit configured to perform an operation performed by the first network device.

The transceiver unit 2010 may be configured to send first information to a second network device, where the first information indicates an association relationship between multicast service information and a first terminal device; the transceiver unit 2010 is further configured to receive second information from the second network device; the processing unit 2020 is configured to generate a configuration message based on the second information, where the configuration message indicates an association relationship between the multicast service information and a first logical channel, and the first logical channel is a logical channel of the first terminal device; and the transceiver unit 2010 is further configured to send the configuration message to the first terminal device, where the first network device has a packet data convergence protocol layer function, a service data adaptation protocol layer function, and a radio resource control layer function, and the second network device has a radio link control layer function, a media access control layer function, and a physical layer function.

Optionally, the second information indicates the association relationship between the multicast service information and the first logical channel.

Optionally, that the first information indicates an association relationship between multicast service information and a first terminal device includes: the first information indicates an association relationship between the multicast service information and a first data radio bearer DRB of the first terminal device; and the second information indicates an association relationship between the first DRB and the first logical channel of the first terminal device.

Optionally, the multicast service information includes one or more of the following: a multicast area identifier, a temporary mobile group identity TMGI, a session identifier, and a group radio network temporary identifier G-RNTI.

Optionally, the configuration message is a radio resource control RRC reconfiguration message.

In an implementation, the communication apparatus 2000 corresponds to the second network device (namely, the DU) in the foregoing method 300. The communication apparatus 2000 may be the second network device or a chip configured in the second network device, and may include a unit configured to perform an operation performed by the second network device.

The transceiver unit 2010 may be configured to receive first information from a first network device, where the first information indicates an association relationship between multicast service information and a first terminal device; and the transceiver unit 2010 is further configured to send second information to the first network device, where the second information is used to determine a configuration message, the configuration message indicates an association relationship between the multicast service information and a first logical channel, and the first logical channel is a logical channel of the first terminal device; and the first network device has a packet data convergence protocol layer function, a service data adaptation protocol layer function, and a radio resource control layer function, and the second network device has a radio link control layer function, a media access control layer function, and a physical layer function.

Optionally, the second information indicates the association relationship between the multicast service information and the first logical channel.

Optionally, that the first information indicates an association relationship between multicast service information and a terminal device includes: the first information indicates an association relationship between the multicast service information and a first data radio bearer DRB of the first terminal device; and the second information indicates an association relationship between the first DRB and the first logical channel of the first terminal device.

Optionally, the multicast service information includes one or more of the following: a multicast area identifier, a temporary mobile group identity TMGI, a session identifier, and a group radio network temporary identifier G-RNTI.

In an implementation, the communication apparatus 2000 corresponds to the terminal device in the foregoing method 300. The communication apparatus 2000 may be the terminal device or a chip configured in the terminal device and may include a unit configured to perform an operation performed by the terminal device.

The transceiver unit 2010 may be configured to receive a configuration message from a first network device, where the configuration message indicates an association relationship between multicast service information and a first logical channel of the terminal device; and the transceiver unit 2010 is further configured to receive, on the first logical channel based on the configuration message, a multicast service corresponding to the multicast service information.

Optionally, the multicast service information includes one or more of the following: a multicast area identifier, a temporary mobile group identity (TMGI), a session identifier, and a group radio network temporary identifier (G-RNTI).

Optionally, the configuration message is a radio resource control RRC reconfiguration message.

In an implementation, the communication apparatus 2000 corresponds to the first network device (namely, the CU) in the foregoing method 400. The communication apparatus 2000 may be the first network device or a chip configured in the first network device, and may include a unit configured to perform an operation performed by the first network device.

the transceiver unit 2010 may be configured to send multicast service information to a second network device. The transceiver unit 2010 may be further configured to receive, from the second network device, configuration information of a multicast control channel, where the configuration information is determined based on the multicast service information; the processing unit 2020 is configured to generate system information based on the configuration information, where the system information includes the configuration information. The transceiver unit 2010 may be further configured to send the system information to the second network device, where the first network device has a packet data convergence protocol layer function, a service data adaptation protocol layer function, and a radio resource control layer function, and the second network device has a radio link control layer function, a media access control layer function, and a physical layer function.

Optionally, the system information is a system information block SIB 13 or SIB 20.

Optionally, the transceiver unit 2010 is further configured to send, to the second network device, a multicast service type corresponding to the multicast service information.

Optionally, the transceiver unit 2010 is further configured to send, to the second network device, a TNL address on a first network device side corresponding to the multicast service information, where the TNL address includes an IP address and a TEID.

Optionally, the multicast service information includes one or more of the following: a multicast area identifier, a temporary mobile group identity TMGI, a session identifier, and QoS information.

Optionally, the configuration information includes one or more of the following: a repetition periodicity of the multicast control channel, an offset of the multicast control channel, a modification periodicity of the multicast control channel, subframe allocation information of the multicast control channel, multimedia broadcast multicast service single frequency network MBSFN area configuration information, a notification indication, and a non-MB SFN area length.

Optionally, the transceiver unit 2010 may be configured to send a session start request message to the second network device, where the session start request message includes the multicast service information; or send a session modification request message to the second network device, where the session modification request message includes the multicast service information.

In an implementation, the communication apparatus 2000 corresponds to the second network device (namely, the DU) in the foregoing method 400. The communication apparatus 2000 may be the second network device or a chip configured in the second network device, and may include a unit configured to perform an operation performed by the second network device.

The transceiver unit 2010 may be configured to receive multicast service information from a first network device; the processing unit 2020 is configured to determine configuration information of a multicast control channel based on the multicast service information. The transceiver unit 2010 may be further configured to send the configuration information to the first network device; the transceiver unit 2010 is further configured to receive system information from the first network device, where the system information includes the configuration information. The transceiver unit 2010 may be further configured to broadcast the system information, where the first network device has a packet data convergence protocol layer function, a service data adaptation protocol layer function, and a radio resource control layer function, and the second network device has a radio link control layer function, a media access control layer function, and a physical layer function.

Optionally, the system information is a system information block SIB 13 or SIB 20.

Optionally, the multicast service information includes one or more of the following: a multicast area identifier, a temporary mobile group identity TMGI, a session identifier, and quality of service QoS information.

Optionally, the configuration information includes one or more of the following: a repetition periodicity of the multicast control channel, an offset of the multicast control channel, a modification periodicity of the multicast control channel, subframe allocation information of the multicast control channel, multimedia broadcast multicast service single frequency network MBSFN area configuration information, a notification indication, and a non-MB SFN area length.

Optionally, the transceiver unit 2010 may be configured to receive a session start request message from the first network device, where the session start request message includes the multicast service information; or receive a session modification request message from the first network device, where the session modification request message includes the multicast service information.

In an implementation, the communication apparatus 2000 corresponds to the IAB node in the foregoing method 1200. The communication apparatus 2000 may be the IAB node or a chip configured in the IAB node, and may include a unit configured to perform an operation performed by the IAB node.

The transceiver unit 2010 may be configured to receive at least one piece of multicast service information from a first network device, where the at least one piece of multicast service information indicates at least one multicast service that the IAB node needs to monitor and multicast, and the first network device is a central unit Donor-CU of a donor node. The transceiver unit 2010 may be further configured to receive the at least one multicast service from a parent node of the IAB node based on the at least one piece of multicast service information. The transceiver unit 2010 may be further configured to multicast the at least one multicast service.

Optionally, the processing unit 2020 is configured to determine configuration information of a multicast control channel based on the at least one piece of multicast service information; the transceiver unit 2010 is further configured to send the configuration information of the multicast control channel to the first network device; the transceiver unit 2010 is further configured to receive system information from the first network device, where the system information includes the configuration information of the multicast control channel; the transceiver unit 2010 is further configured to broadcast the system information; and the transceiver unit 2010 is further configured to send configuration information of at least one multicast traffic channel on the multicast control channel based on the configuration information of the multicast control channel, where the at least one multicast traffic channel is used to multicast the at least one multicast service.

Optionally, the multicast service information includes one or more of the following: a temporary mobile group identity TMGI, a multimedia broadcast multicast service MBMS session identifier, a group radio network temporary identifier G-RNTI, and a logical channel identity.

Optionally, the communication apparatus 2000 includes a mobile termination MT and a distributed unit DU; and the transceiver unit 2010 may be configured to receive an RRC message from the first network device by using the MT, where the RRC message includes the at least one piece of multicast service information; or receive a first interface message from the first network device by using the DU, where the first interface message includes the at least one piece of multicast service information.

In an implementation, the communication apparatus 2000 corresponds to the first network device (namely, the CU of the donor node) in the foregoing method 1200. The communication apparatus 2000 may be the first network device or a chip configured in the first network device and may include a unit configured to perform an operation performed by the first network device.

The transceiver unit 2010 may be configured to send, to each integrated access and backhaul IAB node that is on a path from the communication apparatus 2000 to a first terminal device, at least one piece of multicast service information corresponding to the IAB node, where the at least one piece of multicast service information indicates at least one multicast service that the corresponding IAB node needs to monitor and multicast; and the transceiver unit 2010 is further configured to send, to a second network device, the at least one multicast service that the IAB node needs to monitor and multicast, where the second network device is a central unit Donor-CU of the donor node.

Optionally, the transceiver unit 2010 is further configured to receive configuration information of a multicast control channel from each IAB node, where the configuration information of the multicast control channel of the IAB node is determined by the IAB node based on the at least one piece of corresponding multicast service information; the processing unit 2020 is configured to determine system information of the IAB node based on the configuration information of the multicast control channel of the IAB node, where the system information of the IAB node includes the configuration information of the multicast control channel of the IAB node; and the transceiver unit 2010 is further configured to send the system information to the IAB node.

Optionally, the multicast service information includes one or more of the following: a temporary mobile group identity TMGI, a multimedia broadcast multicast service MBMS session identifier, a group radio network temporary identifier G-RNTI, and a logical channel identity.

Optionally, the IAB node includes a mobile termination MT and a distributed unit DU; and transceiver unit 2010 may be configured to send an RRC message to the mobile termination of the IAB node by using the MT, where the RRC message includes the at least one piece of multicast service information; or send a first interface message to the mobile termination of the IAB node by using the DU, where the first interface message includes the at least one piece of multicast service information.

In an implementation, the communication apparatus 2000 corresponds to the second network device (namely, the DU of the donor node) in the foregoing method 900. The communication apparatus 2000 may be the second network device or a chip configured in the second network device and may include a unit configured to perform an operation performed by the second network device.

The transceiver unit 2010 may be configured to receive a first multicast service from a first network device, where the first multicast service includes a transport network layer TNL address, the TNL address corresponds to the first multicast service, and the first network device is a central unit Donor-CU of a donor node. The transceiver unit 2010 may be further configured to forward the first multicast service to a next-hop integrated access and backhaul IAB node based on first configuration information.

Optionally, the transceiver unit 2010 is further configured to: when the processing unit 2020 determines, based on the first configuration information, that the first multicast service needs to be multicast to a terminal device accessing the second network device, multicast the first multicast service to the terminal device accessing the second network device.

Optionally, the processing unit 2020 is further configured to: add, based on the first configuration information, routing information corresponding to the first multicast service to a backhaul adaptation protocol BAP header corresponding to the first multicast service, and determine a second link configuration based on the first configuration information; and the transceiver unit 2010 may be configured to send the first multicast service to the next-hop IAB node through a second link, where the BAP header corresponding to the first multicast service includes the routing information.

Optionally, the transceiver unit 2010 is further configured to receive the first configuration information from the first network device.

In an implementation, the communication apparatus 2000 corresponds to the first IAB node in the foregoing method 900. The communication apparatus 2000 may be the first IAB node or a chip configured in the first IAB node and may include a unit configured to perform an operation performed by the first IAB node.

The transceiver unit 2010 may be configured to receive a first multicast service; the processing unit 2020 is configured to determine, based on second configuration information, whether the first multicast service needs to be forwarded to another IAB node; when the first multicast service needs to be forwarded to another IAB node, the processing unit 2020 is further configured to determine a next-hop IAB node and a first backhaul link based on the second configuration information. The transceiver unit 2010 may be further configured to forward the first multicast service to the next-hop IAB node through the first backhaul link.

Optionally, the processing unit 2020 is further configured to determine, based on the second configuration information, whether the first multicast service needs to be multicast to a terminal device accessing the first IAB node; and when the processing unit 2020 determines that the first multicast service needs to be multicast to the terminal device accessing the first IAB node, the transceiver unit 2010 is further configured to multicast the first multicast service on a multicast traffic channel corresponding to the first multicast service.

Optionally, the transceiver unit 2010 is further configured to receive the second configuration information from a first network device, where the first network device is a central unit Donor-CU of a donor node.

Optionally, the second configuration information includes one or more of the following: multicast service information corresponding to the first multicast service, routing information, a BAP address of the next-hop node, a first link configuration, and an indication indicating whether multicast is required for the terminal device accessing the first IAB node; and the routing information includes a BAP address of a last-hop IAB node, and the routing information is used by the first IAB node to determine whether the first multicast service needs to be forwarded to another IAB node.

Optionally, the first backhaul link configuration is a logical channel that is between the first IAB node and the next-hop IAB node and that is used to forward the first multicast service.

Optionally, the multicast service information includes one or more of the following: a temporary mobile group identity (TMGI), a multimedia broadcast multicast service (MBMS) session identifier, a group radio network temporary identifier (G-RNTI), and a logical channel identity.

In an implementation, the communication apparatus 2000 corresponds to the second IAB node in the foregoing method 900. The communication apparatus 2000 may be the second IAB node or a chip configured in the second IAB node and may include a unit configured to perform an operation performed by the second IAB node.

The transceiver unit 2010 may be configured to receive a first multicast service from a previous-hop IAB node, where the first multicast service includes a routing identifier and a multicast internet protocol IP address; the processing unit 2020 is configured to determine, based on the routing identifier, whether the first multicast service needs to be forwarded to another IAB node; when the transceiver unit 2010 does not need to forward the first multicast service, the processing unit 2020 is further configured to determine, based on the multicast IP address and third configuration information, a multicast traffic channel corresponding to the first multicast service, where the third configuration information indicates a correspondence between multicast service information of the first multicast service and the multicast IP address; and the transceiver unit 2010 is further configured to multicast the first multicast service on the multicast traffic channel corresponding to the first multicast service.

Optionally, the transceiver unit 2010 is further configured to receive the third configuration information from a first network device, where the first network device is a central unit Donor-CU of a donor node.

Optionally, the transceiver unit 2010 is further configured to receive an RRC message from the first network device, where the RRC message includes the third configuration information; or receive a first interface message from the first network device, where the first interface message includes the third configuration information.

Optionally, the multicast service information includes one or more of the following: a temporary mobile group identity TMGI, a multimedia broadcast multicast service MBMS session identifier, a group radio network temporary identifier G-RNTI, and a logical channel identity.

In an implementation, the communication apparatus 2000 corresponds to the first network device (namely, the CU of the donor node) in the foregoing method 900. The communication apparatus 2000 may be the first network device or a chip configured in the first network device, and may include a unit configured to perform an operation performed by the first network device.

The transceiver unit 2010 may be configured to: send first configuration information to a second network device, send second configuration information to each first IAB node that is on a path from the communication apparatus 2000 to a first terminal device, and send third configuration information to a third IAB node, where the second network device is a distributed unit Donor-DU of the donor node, where the first configuration information, the second configuration information, and the third configuration information are used to send a first multicast service; the first configuration information is used by the second network device to determine whether the first multicast service needs to be multicast to a terminal device accessing the second network device, determine a first IAB node receiving the first multicast service, and determine a configuration of a link used to send the first multicast service to the first IAB node receiving the first multicast service; the second configuration information is used by the first IAB node to determine whether the first multicast service needs to be multicast to a terminal device accessing the first IAB node, determine another first IAB node receiving the first multicast service, and determine a configuration of a link used to send the first multicast service to the another first IAB node receiving the first multicast service; and the third configuration information is used by a second IAB node to determine a multicast traffic channel corresponding to the first multicast service.

It should be understood that, the communication apparatus 2000 corresponds to each node in the method shown in FIG. 11, and may include a unit configured to perform an operation performed by the corresponding node in the method shown in FIG. 11.

It should be further understood that, a process in which each unit performs a corresponding step in the foregoing method embodiment has been described in detail in the foregoing method embodiment. For brevity, details are not described herein again.

Figure 16:
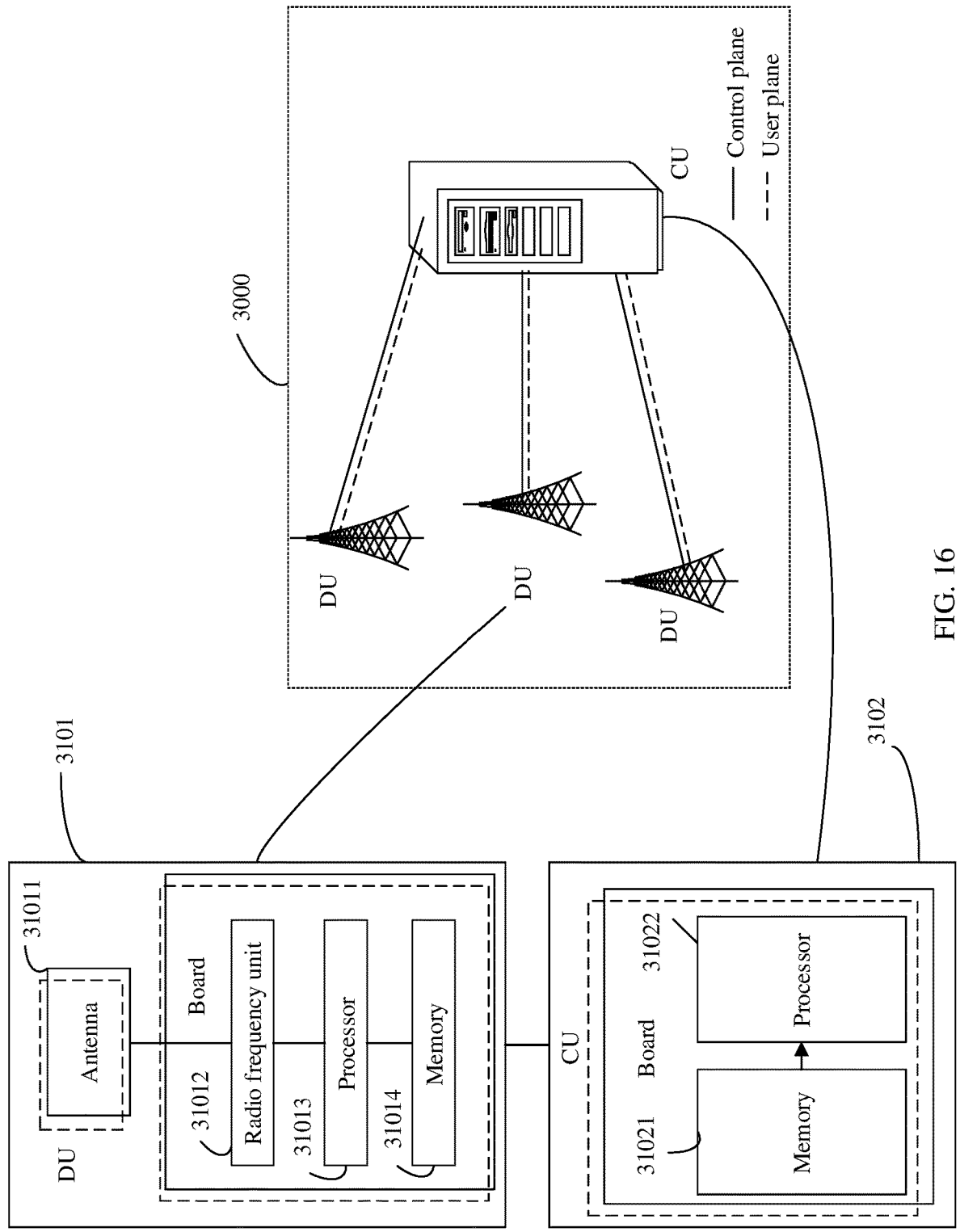
FIG. 16 is a schematic block diagram of a network device.

FIG. 16 is a schematic diagram of a structure of a network device according to an embodiment, for example, may be a schematic diagram of a structure of a base station. As shown in FIG. 16, the network device may implement a function of the IAB node in the foregoing method embodiment, a DU 3101 in the network device may further implement a function of the DU or the second network device in the foregoing method embodiment, and a CU 3102 in the network device may further implement a function of the CU or the first network device in the foregoing method embodiment.

The network device 3000 may include one or more DUs 3101 and one or more CUs 3102. The CU 3102 may communicate with a next generation core (NG core, NC) network. The DU 3101 may include at least one antenna 31011, at least one radio frequency unit 31012, at least one processor 31013, and at least one memory 31014. The DU 3101 may be configured to: send and receive a radio frequency signal, perform conversion between the radio frequency signal and a baseband signal, and perform some baseband processing. The CU 3102 may include at least one processor 31022 and at least one memory 31021. The CU 3102 and the DU 3101 may communicate with each other through an interface. A control plane interface may be Fs-C, for example, F1-C, and a user plane interface may be Fs-U, for example, F1-U.

The CU 3102 may be configured to: perform baseband processing, control the base station, and the like. The DU 3101 and the CU 3102 may be physically disposed together, or may be physically disposed separately, namely, a distributed base station. The CU 3102 is a control center of the base station, may also be referred to as a processing unit, and may be configured to implement a baseband processing function. For example, the CU 3102 may be configured to control the base station to perform an operation procedure related to the base station in the foregoing method embodiment.

Baseband processing on the CU and the DU may be divided based on protocol layers of a wireless network. For example, functions of a packet data convergence protocol (PDCP) layer and a protocol layer above the PDCP layer are set on the CU. Functions of one or more of protocol layers such as a radio link control (RLC) layer and a media access control (MAC) layer below the PDCP layer are set on the DU. For another example, the CU implements functions of a radio resource control (RRC) layer and a packet data convergence protocol (PDCP) layer. The DU implements functions of a radio link control (RLC) layer, a MAC layer, and a physical (PHY) layer.

In addition, optionally, the network device 3000 may include one or more radio frequency units (RUs), one or more DUs, and one or more CUs. The DU may include at least one processor 31013 and at least one memory 31014, the RU may include at least one antenna 31011 and at least one radio frequency unit 31012, and the CU may include at least one processor 31022 and at least one memory 31021.

In an example, the CU 3102 may include one or more boards. A plurality of boards may jointly support a radio access network (for example, a 5G network) of a single access standard, or may separately support radio access networks (such as an LTE network, a 5G network, or another network) of different access standards. The memory 31021 and the processor 31022 may serve one or more boards. In other words, the memory and the processor may be separately disposed on each board. Alternatively, a plurality of boards may share a same memory and a same processor. In addition, a necessary circuit may be further disposed on each board. The DU 3101 may include one or more boards. A plurality of boards may jointly support a radio access network (for example, a 5G network) of a single access standard, or may separately support radio access networks (such as an LTE network, a 5G network, or another network) of different access standards. The memory 31014 and the processor 31013 may serve one or more boards. In other words, the memory and the processor may be separately disposed on each board. Alternatively, a plurality of boards may share a same memory and a same processor. In addition, a necessary circuit may be further disposed on each board.

Figure 17:
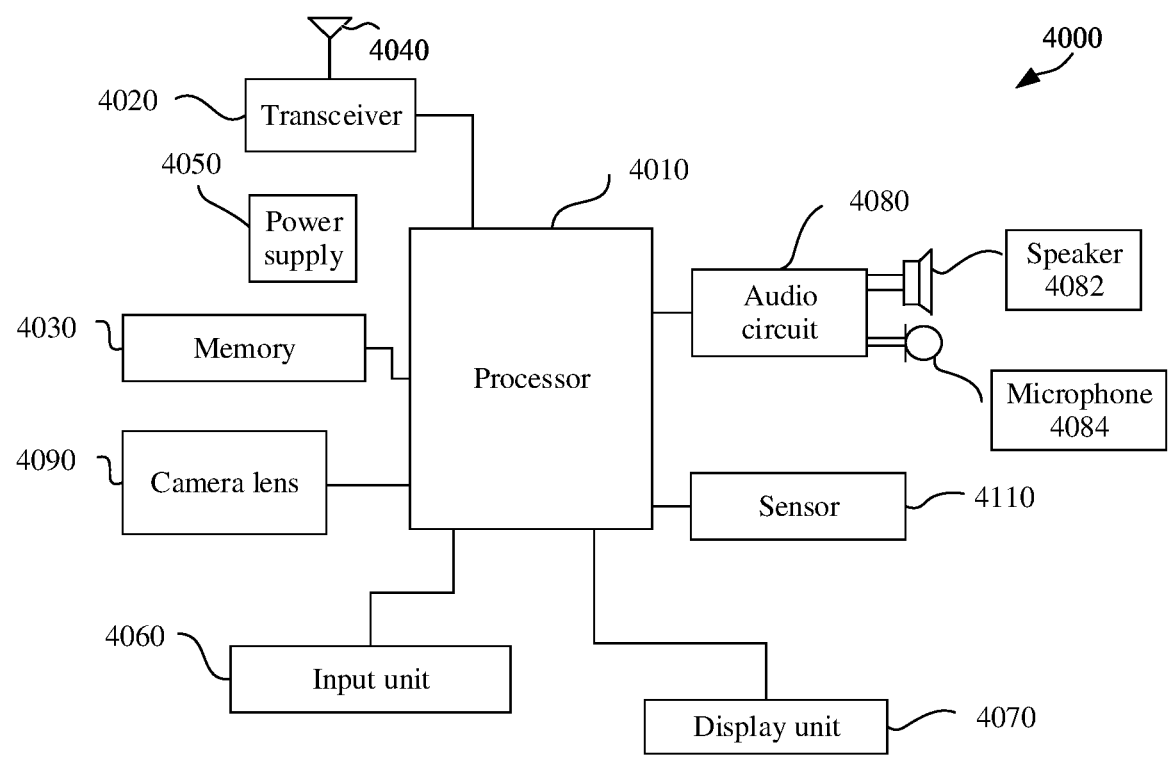
FIG. 17 is a schematic block diagram of a terminal device.

FIG. 17 is a schematic diagram of a structure of a terminal device 4000 according to an embodiment. The terminal device 4000 may perform functions of the terminal device in the foregoing method embodiment. As shown in FIG. 17, the terminal device 4000 includes a processor 4010 and a transceiver 4020. Optionally, the terminal device 4000 further includes a memory 4030. The processor 4010, the transceiver 4020, and the memory 4030 may communicate with each other through an internal connection path, to transfer a control signal and/or a data signal. The memory 4030 is configured to store a computer program. The processor 4010 is configured to invoke and run the computer program in the memory 4030, to control the transceiver 4020 to receive or send a signal. Optionally, the terminal device 4000 may further include an antenna 4040, configured to send, by using a radio signal, uplink data or uplink control signaling output by the transceiver 4020.

The processor 4010 and the memory 4030 may be integrated into one processing apparatus. The processor 4010 is configured to execute program code stored in the memory 4030 to implement the foregoing functions. During implementation, the memory 4030 may alternatively be integrated into the processor 4010 or may be independent of the processor 4010. The processor 4010 may correspond to the processing unit in FIG. 15.

The transceiver 4020 may correspond to the transceiver unit in FIG. 15, and may also be referred to as a transceiver unit. The transceiver 4020 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that, the terminal device 4000 shown in FIG. 17 can implement processes related to the terminal device in the foregoing method embodiment. Operations and/or functions of modules in the terminal device 4000 are respectively intended to implement corresponding procedures in the foregoing method embodiments. For details, refer to the descriptions in the foregoing method embodiments. To avoid repetition, detailed descriptions are properly omitted herein.

The processor 4010 may be configured to perform an action implemented inside the terminal device described in the foregoing method embodiment, and the transceiver 4020 may be configured to perform an action of sending performed by the terminal device to the base station or receiving performed by the terminal device from the base station described in the foregoing method embodiment. For details, refer to the descriptions in the foregoing method embodiments. Details are not described herein again.

Optionally, the terminal device 4000 may further include a power supply 4050, configured to supply power to various devices or circuits in the terminal device.

In addition, to improve functions of the terminal device, the terminal device 4000 may further include one or more of an input unit 4060, a display unit 4070, an audio circuit 4080, a camera lens 4090, a sensor 4110, and the like. The audio circuit may further include a speaker 4082, a microphone 4084, and the like.

An embodiment may further provide a processing apparatus, including a processor and an interface. The processor is configured to perform the method in the foregoing method embodiment.

It should be understood that, the processing apparatus may be one or more chips. For example, the processing apparatus may be a field programmable gate array (FPGA), an application-specific integrated circuit (ASIC), a system on chip (SoC), a central processing unit (CPU), a network processor (NP), a digital signal processor (DSP), a micro controller unit (MCU), a programmable logic device (PLD), or another integrated chip.

In an implementation process, steps in the foregoing method may be implemented by using a hardware integrated logic circuit in the processor or an instruction in a form of software. The steps of the method with reference to the embodiments may be directly presented as being performed and completed by a hardware processor, or performed and completed by a combination of hardware and a software module in a processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor. To avoid repetition, details are not described herein again.

It should be understood that, the processor in the embodiments may be an integrated circuit chip, and has a signal processing capability. In an implementation process, steps in the foregoing method embodiments may be implemented by using a hardware integrated logic circuit in the processor or an instruction in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component.

It may be understood that, in the embodiments, the memory may be a volatile memory, a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that, memories in the system and method include, but are not limited to, the memories and memories of any other proper types.

The embodiments may further provide a computer program product. The computer program product includes computer program code. When the computer program code is run on a computer, the computer is enabled to perform the method on a terminal device side in any one of the foregoing method embodiments.

The embodiments may further provide a non-transitory computer-readable medium. The non-transitory computer-readable medium stores program code. When the program code is run on a computer, the computer is enabled to perform the method on a network device side in the foregoing method embodiment.

The embodiments may further provide a system. The system includes a first network device and a second network device.

An embodiment may further provide a processing apparatus, including a processor and an interface. The processor is configured to perform the communication method in any one of the foregoing method embodiments.

The processing apparatus may be a chip. For example, the processing apparatus may be a field programmable gate array (FPGA), may be a general-purpose processor, a digital signal processor (DSP), an application-specific integrated circuit (ASIC), the field programmable gate array (FPGA), another programmable logic device, a discrete gate, a transistor logic device, or a discrete hardware component, may be a system on chip (SoC), may be a central processing unit (CPU), may be a network processor (NP), may be a digital signal processor (DSP), may be a micro controller unit (MCU), or may be a programmable controller (PLD) or another integrated chip. The methods, the steps, and logic block diagrams that are in the embodiments may be implemented or performed. The general-purpose processor may be a microprocessor, or the processor may be any conventional processor or the like. The steps of the method with reference to the embodiments may be directly presented as being performed and completed by a hardware decoding processor or performed and completed by a combination of hardware and a software module in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor.

It may be understood that, in the embodiments, the memory may be a volatile memory, a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that, memories in the system and method include, but are not limited to, the memories and memories of any other proper types.

All or some of the foregoing embodiments may be implemented through software, hardware, firmware, or any combination thereof. When software is used to implement embodiments, all or some of embodiments may be implemented in a form of a computer program product. The computer program product includes one or more computer instructions. When the computer instructions are loaded and executed on the computer, the procedure or functions according to the embodiments are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments exactly correspond to the network device and the terminal device in the method embodiments. A corresponding module or unit performs a corresponding step. For example, a communication unit (a transceiver) performs a receiving step or a sending step in the method embodiments, and a processing unit (a processor) may perform a step other than the sending step and the receiving step. For a function of a unit, refer to a corresponding method embodiment. There may be one or more processors.

Terms such as "component", "module", and "system" indicate computer-related entities, hardware, firmware, combinations of hardware and software, software, or software being executed. For example, a component may be but is not limited to a process that runs on a processor, a processor, an object, an executable file, an execution thread, a program, or a computer. As illustrated by using figures, both a computing device and an application that runs on the computing device may be components. One or more components may reside within a process or an execution thread, and a component may be located on one computer or distributed between two or more computers. In addition, these components may be executed by various computer-readable media that store various data structures. For example, the components may communicate by using a local or remote process based on a signal having one or more data packets (for example, data from two components interacting with another component in a local system, in a distributed system, or across a network such as the Internet interacting with another system by using the signal).

An "embodiment" means that particular features, structures, or characteristics related to this embodiment are included in at least one embodiment. Therefore, embodiments do not necessarily refer to a same embodiment. In addition, the particular features, structures, or characteristics may be combined in one or more embodiments by using any appropriate manner.

It should be understood that, in the embodiments, numbers "first", "second", and the like are merely used to distinguish between different objects, for example, to distinguish between different network devices, and do not constitute a limitation on the scope of the embodiments.

It should be further understood that, both "when" and "if" mean that a network element performs corresponding processing in an objective situation, but do not constitute a limitation on time, do not require that the network element has a determining action during implementation, and do not mean other limitations either.

"At least one" means one or more, and "a plurality of" means two or more.

It should be further understood that, in the embodiments, "B corresponding to A" indicates that B is associated with A, and B may be determined based on A. However, it should be further understood that determining B based on A does not mean that B is determined based only on A. B may alternatively be determined based on A and/or other information.

The term "and/or" may describe an association relationship between associated objects and indicates that there may be three relationships. For example, A and/or B may represent the following three cases: only A exists, both A and B exist, and only B exists. In addition, the character "/" may indicate an "or" relationship between the associated objects.

Unless otherwise specified, "an item includes one or more of the following: A, B, and C" may mean that the item may be any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. In the foregoing descriptions, three elements A, B, and C are used as an example to describe an optional case of the item. When an expression is "the item includes at least one of the following: A, B, and X", in other words, more elements are included in the expression, a case to which the item is applicable may also be obtained according to the foregoing rule.

It may be understood that, in the embodiments, the terminal device and/or the network device may perform some or all steps in the embodiments. These steps or operations are merely examples. In the embodiments, other operations or variations of various operations may be further performed. In addition, the steps may be performed in a sequence different from a sequence presented in the embodiments, and not all the operations in the embodiments may be performed.

A person of ordinary skill in the art may be aware that units and algorithm steps in the examples described with reference to embodiments may be implemented by electronic hardware or a combination of computer software and electronic hardware. Whether the functions are performed by hardware or software depends on particular applications. A person skilled in the art may use different methods to implement the described functions of each particular application, but it should not be considered that the implementation goes beyond the scope of the embodiments.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments, it should be understood that the system, apparatus, and method may be implemented in other manners. For example, the described apparatus embodiment is merely an example. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in the embodiments may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the embodiments essentially, or the part contributing to the conventional technology, or some of the solutions may be implemented in a form of a software product. The computer software product is stored in a non-transitory storage medium and includes several instructions for instructing a computer device (which may be a personal computer, a server, a network device, or the like) to perform all or some of the steps of the method described in the embodiments. The foregoing storage medium includes: any medium that can store program code, such as a USB flash drive, a removable hard disk, a read-only memory ROM, a random access memory RAM, a magnetic disk, or an optical disc.

The foregoing descriptions are merely implementations, but are not intended as limiting. Any variation or replacement readily figured out by a person skilled in the art shall fall within the scope of the embodiments.

What is claimed is:

1. A communication apparatus, which is a first network device or included in the first network device, wherein the communication apparatus comprises a processor, wherein the processor is coupled to a memory; and the memory, configured to store a computer program, wherein the processor is configured to execute the computer program stored in the memory, to cause the communication apparatus to perform operations comprising:

sending first information to a second network device, wherein the first information indicates an association relationship between multicast service information and a first terminal device;

receiving second information from the second network device;

generating a configuration message based on the second information, wherein the configuration message indicates an association relationship between the multicast service information and a first logical channel, and the first logical channel is a logical channel of the first terminal device; and sending the configuration message to the first terminal device, wherein
the first network device has a packet data convergence protocol layer function, a service data adaptation protocol layer function, and a radio resource control layer function, and the second network device has a radio link control layer function, a media access control layer function, and a physical layer function.

2. The communication apparatus according to claim 1, wherein the second information indicates the association relationship between the multicast service information and the first logical channel.

3. The communication apparatus according to claim 1, wherein that the first information indicates an association relationship between multicast service information and a first terminal device comprises:
the first information indicates an association relationship between the multicast service information and a first data radio bearer of the first terminal device; and
the second information indicates an association relationship between the first data radio bearer and the first logical channel of the first terminal device.

4. The communication apparatus according to claim 1, wherein the multicast service information comprises one or more of the following: a multicast area identifier, a temporary mobile group identity, a session identifier, and a group radio network temporary identifier.

5. The communication apparatus according to claim 1, wherein the configuration message is a radio resource control reconfiguration message.

6. The communication apparatus according to claim 1, wherein the first network device and the second network device correspond to a same base station.

7. A communication apparatus, which is a second network device or included in the second network device, wherein the communication apparatus comprises a processor, wherein the processor is coupled to a memory; and
the memory, configured to store a computer program, wherein
the processor is configured to execute the computer program stored in the memory, to cause the communication apparatus to perform operations comprising:
receiving first information from a first network device, wherein the first information indicates an association relationship between multicast service information and a first terminal device; and
sending second information to the first network device, wherein the second information is used to determine a configuration message, the configuration message indicates an association relationship between the multicast service information and a first logical channel, and the first logical channel is a logical channel of the first terminal device; and
the first network device has a packet data convergence protocol layer function, a service data adaptation protocol layer function, and a radio resource control layer function, and the second network device has a radio link control layer function, a media access control layer function, and a physical layer function.

8. The communication apparatus according to claim 7, wherein the second information indicates the association relationship between the multicast service information and the first logical channel.

9. The communication apparatus according to claim 7, wherein that the first information indicates an association relationship between multicast service information and a first terminal device comprises:
the first information indicates an association relationship between the multicast service information and a first data radio bearer of the first terminal device; and
the second information indicates an association relationship between the first data radio bearer and the first logical channel of the first terminal device.

10. The communication apparatus according to claim 7, wherein the multicast service information comprises one or more of the following: a multicast area identifier, a temporary mobile group identity, a session identifier, and a group radio network temporary identifier.

11. The communication apparatus according to claim 7, wherein the first network device and the second network device correspond to a same base station.

12. A communication apparatus, which is a terminal device or included in the terminal device, wherein the communication apparatus comprises a processor, wherein the processor is coupled to a memory; and
the memory, configured to store a computer program, wherein
the processor is configured to execute the computer program stored in the memory, to cause the communication apparatus to perform operations comprising:
receiving a configuration message from a first network device, wherein the configuration message is based on information received from a second network device and indicates an association relationship between multicast service information and a first logical channel of the terminal device; and
receiving on the first logical channel based on the configuration message, a multicast service corresponding to the multicast service information, wherein
the first network device has a packet data convergence protocol layer function, a service data adaptation protocol layer function, and a radio resource control layer function, and the second network device has a radio link control layer function, a media access control layer function, and a physical layer function.

13. The communication apparatus according to claim 12, wherein the multicast service information comprises one or more of the following: a multicast area identifier, a temporary mobile group identity, a session identifier, and a group radio network temporary identifier.

14. The communication apparatus according to claim 12, wherein the configuration message is a radio resource control (RRC) reconfiguration message.

15. The communication apparatus according to claim 12, wherein the first network device and the second network device correspond to a same base station.

16. The communication apparatus according to claim 12, wherein the information received from the second network device indicates the association relationship between the multicast service information and the first logical channel.

* * * * *